(12) United States Patent
Ishibashi et al.

(10) Patent No.: US 12,021,440 B2
(45) Date of Patent: Jun. 25, 2024

(54) POWER CONVERSION DEVICE AND DC POWER DISTRIBUTION SYSTEM

(71) Applicant: Mitsubishi Electric Corporation, Tokyo (JP)

(72) Inventors: Takaharu Ishibashi, Tokyo (JP); Takushi Jimichi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 309 days.

(21) Appl. No.: 17/299,783

(22) PCT Filed: Jan. 21, 2019

(86) PCT No.: PCT/JP2019/001659
§ 371 (c)(1),
(2) Date: Jun. 4, 2021

(87) PCT Pub. No.: WO2020/152746
PCT Pub. Date: Jul. 30, 2020

(65) Prior Publication Data
US 2022/0021311 A1  Jan. 20, 2022

(51) Int. Cl.
*H02M 3/335* (2006.01)
*H02M 1/00* (2006.01)

(52) U.S. Cl.
CPC ......... *H02M 1/008* (2021.05); *H02M 1/0058* (2021.05); *H02M 1/007* (2021.05); *H02M 3/33573* (2021.05); *H02M 3/33584* (2013.01)

(58) Field of Classification Search
CPC .. H02M 1/008; H02M 1/007; H02M 3/33573; H02M 3/33584; H02M 3/33569
See application file for complete search history.

(56) References Cited

U.S. PATENT DOCUMENTS 8,467,199 B2   6/2013 Lee et al.
2008/0212340 A1  9/2008 Tao et al.
(Continued)

FOREIGN PATENT DOCUMENTS

JP  2008-543271 A  11/2008
JP  2015-119598 A   6/2015
WO  2006/131870 A1 12/2006

OTHER PUBLICATIONS

Extended European search report dated Jan. 5, 2022, in corresponding European patent Application No. 19911616.1, 9 pages.
(Continued)

*Primary Examiner* — Alex Torres-Rivera
(74) *Attorney, Agent, or Firm* — XSENSUS LLP

(57) ABSTRACT

A multiwinding transformer includes a primary-side winding and a plurality of secondary-side windings. A primary-side bridge circuit is connected between a primary-side DC terminal and the primary-side winding. A plurality of secondary-side bridge circuits are connected between the plurality of secondary-side windings and a plurality of secondary-side DC terminals, respectively. A switching converter variably controls a first DC voltage of the primary-side DC terminal or a second DC voltage of a first secondary-side DC terminal among the plurality of secondary-side DC terminals such that a voltage ratio between the first DC voltage and the second DC voltage is controlled to a constant ratio in accordance with a turns ratio between the primary-side winding and the secondary-side winding corresponding to the first secondary-side DC terminal among the plurality of secondary-side windings.

12 Claims, 13 Drawing Sheets

(56) References Cited

U.S. PATENT DOCUMENTS

| | | | |
|---|---|---|---|
| 2014/0036545 A1* | 2/2014 | Reddy | H02M 3/33507 |
| | | | 363/17 |
| 2014/0103860 A1* | 4/2014 | Kominami | H02M 3/33576 |
| | | | 320/108 |
| 2017/0005584 A1 | 1/2017 | Guepratte et al. | |
| 2020/0112260 A1* | 4/2020 | Suzuki | H02M 3/33561 |

OTHER PUBLICATIONS

Amit Kumar Jain et al., "PWM Control of Dual Active Bridge: Comprehensive Analysis and Experimental Verification", IEEE Transactions on Power Electronics, vol. 26, No. 4, Apr. 2011, pp. 1215-1227.

International Search Report and Written Opinion dated Mar. 26, 2019, received for PCT Application PCT/JP2019/001659, Filed on Jan. 21, 2019, 7 pages including English Translation.

Communication pursuant to Article 94(3) EPC dated Jun. 20, 2023, in corresponding European Application No. 19 911 616.1, 4pp.

* cited by examiner

POWER CONVERSION DEVICE AND DC POWER DISTRIBUTION SYSTEM

CROSS-REFERENCE TO RELATED APPLICATION

The present application is based on PCT filing PCT/JP2019/001659, filed Jan. 21, 2019, the entire contents of which are incorporated herein by reference.

TECHNICAL FIELD

The present disclosure relates to a power conversion device and a direct-current (DC) power distribution system.

BACKGROUND ART

Japanese Patent National Publication No. 2008-543271 (PTL 1) describes a power converter to carry out DC/DC power conversion in which a bridge circuit is connected to each winding of a multiwinding transformer. PTL 1 proposes expansion of a soft-switching operating range for improvement in efficiency by controlling a half-cycle voltage time integral of a positive or negative part of a rectangular pulse wave provided from each bridge circuit to substantially be equal.

CITATION LIST

Patent Literature

PTL 1: Japanese Patent National Publication No. 2008-543271

SUMMARY OF INVENTION

Technical Problem

In the power converter described in PTL 1, however, efficiency is enhanced by expansion of application of soft switching, whereas transmission power transmitted from a primary-side winding to a secondary-side winding is affected not only by a phase difference between rectangular pulse waves provided from the bridge circuits but also by the half-cycle voltage time integral of the positive or negative part of the rectangular pulse waves. Therefore, there is a concern about complicated power control.

The present disclosure was made to solve such a problem, and enhances efficiency without complicated control in a power conversion device to provide DC power to a plurality of loads by means of a multiwinding transformer including a plurality of secondary-side windings.

Solution to Problem

According to one aspect of the present disclosure, a power conversion device includes a multiwinding transformer including a primary-side winding and a plurality of secondary-side windings, a primary-side DC terminal, a plurality of secondary-side DC terminals, a primary-side bridge circuit, a plurality of secondary-side bridge circuits, and a voltage control circuit. The primary-side DC terminal is supplied with DC power from a DC power supply. The primary-side bridge circuit is connected between the primary-side DC terminal and the primary-side winding, and carries out direct-current (DC)/alternating current (AC) power conversion. The plurality of secondary-side bridge circuits are connected between the plurality of secondary-side windings and the plurality of secondary-side DC terminals, respectively, and carry out AC/DC power conversion. The plurality of secondary-side DC terminals include a first secondary-side DC terminal and a second secondary-side DC terminal. The first secondary-side DC terminal is electrically connected to a first secondary-side winding of the plurality of secondary-side windings with a first secondary-side bridge circuit of the plurality of secondary-side bridge circuits being interposed. The second secondary-side DC terminal is electrically connected to a second secondary-side winding of the plurality of secondary-side windings with a second secondary-side bridge circuit of the plurality of secondary-side bridge circuits being interposed. The voltage control circuit variably controls, even when at least one of a first DC voltage of the primary-side DC terminal and a second DC voltage of the first secondary-side DC terminal varies, the first or second DC voltage so as to maintain a voltage ratio between the first DC voltage and the second DC voltage at a predetermined ratio in accordance with a turns ratio between the primary-side winding and the first secondary-side winding.

Advantageous Effects of Invention

According to the present disclosure, in a power conversion device to provide DC power to a plurality of loads by means of a multiwinding transformer including a plurality of secondary-side windings, a voltage control circuit controls a voltage ratio between a first DC voltage of a primary-side DC terminal and a second DC voltage of a specific secondary-side DC terminal among a plurality of secondary-side DC terminals to be constant at a predetermined ratio in accordance with a turns ratio between a secondary-side winding and a secondary-side winding corresponding to the specific secondary-side DC terminal. Thus, the specific secondary-side DC terminal minimum in power loss in power transmission from a DC power supply to the plurality of secondary-side DC terminals can be provided. Therefore, by providing the specific secondary-side DC terminal suitable for connection of a load maximum in consumed power in an application where the plurality of loads are different from one another in consumed power, efficiency can be enhanced without complicated control.

DESCRIPTION OF EMBODIMENTS

Figure 1:
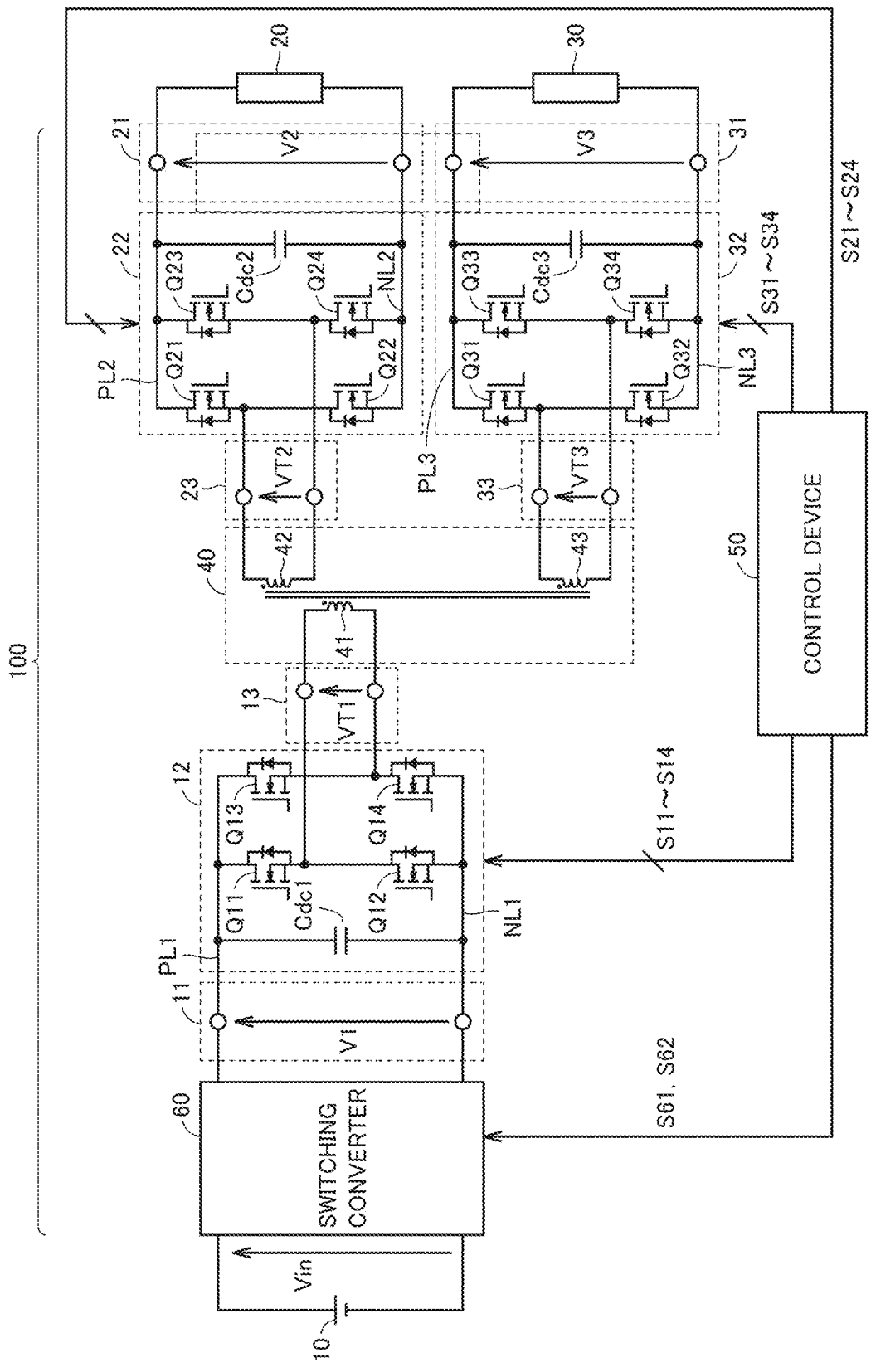
FIG. 1 is a circuit diagram showing an exemplary configuration of a power conversion device according to a first embodiment.

An embodiment of the present disclosure will be described below in detail with reference to the drawings. The same or corresponding elements in the drawings below have the same reference characters allotted and description thereof will not be repeated in principle.

First Embodiment

In a first embodiment, a DC/DC converter including a multiwinding transformer including three windings and three bridge circuits connected to the three respective windings will be described as an exemplary power conversion device according to the present embodiment.

FIG. 1 is a circuit diagram showing an exemplary configuration of a power conversion device according to the first embodiment.

Referring to FIG. 1, a power conversion device 100 according to the first embodiment includes a first DC terminal 11, a second DC terminal 21, and a third DC terminal 31 and a first bridge circuit 12, a second bridge circuit 22, and a third bridge circuit 32. Power conversion device 100 further includes a first AC terminal 13, a second AC terminal 23, and a third AC terminal 33, a multiwinding transformer 40 (which will also simply be referred to as a transformer 40 below) including windings 41 to 43, a control device 50, and a switching converter 60.

Switching converter 60 is connected between a DC power supply 10 and first DC terminal 11. An input voltage from switching converter 60 to first DC terminal 11 is referred to as a DC voltage V1 below. Switching converter 60 carries out DC/DC conversion between an input voltage Vin from DC power supply 10 and DC voltage V1. DC power from DC power supply 10 is supplied through switching converter 60 to first DC terminal 11.

Figure 2:
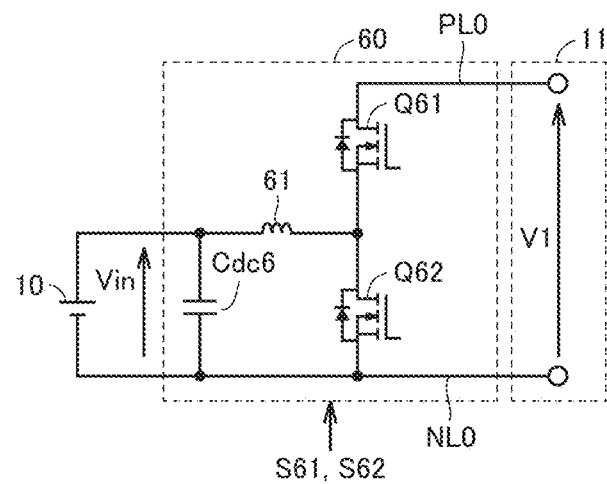
FIG. 2 is a circuit diagram illustrating an exemplary configuration of a switching converter shown in FIG. 1.

FIG. 2 is a circuit diagram illustrating an exemplary configuration of the switching converter.

Referring to FIG. 2, switching converter 60 includes a DC capacitor Cdc6, semiconductor switching elements (which are simply referred to as a "switching element" below) Q61 and Q62, and an inductor 61. In the example in FIG. 2, switching converter 60 is implemented by what is called a bidirectional chopper, and operates as a step-up chopper in power transmission in a direction from DC power supply 10 to first DC terminal 11.

DC capacitor Cdc6 is connected in parallel to DC power supply 10. Switching elements Q61 and Q62 are connected in series between power lines PL0 and NL0 connected to first DC terminal 11. An intermediate connection point between switching elements Q61 and Q62 is connected to a positive electrode of DC power supply 10 with inductor 61 being interposed. Inductor 61 may be connected to a side of power line NL0 so long as it is connected as being interposed in a loop formed by DC power supply 10 and switching element Q62. On and off (switching) of switching elements Q61 and Q62 is controlled by gate signals S61 and S62 from control device 50.

Figure 3:
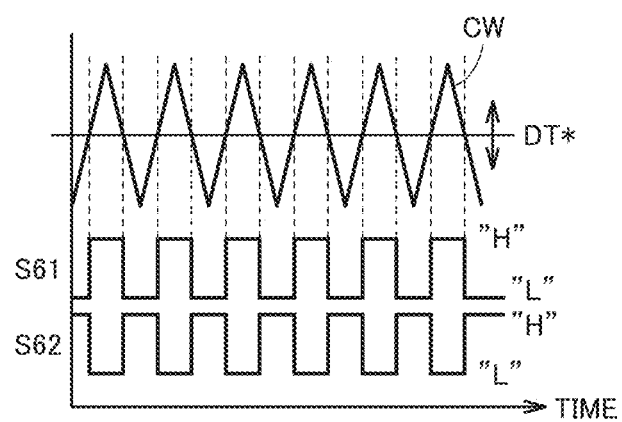
FIG. 3 is an operation waveform diagram of the switching converter shown in FIG. 1.

FIG. 3 is an operation waveform diagram of switching converter 60.

Referring to FIG. 3, switching elements Q61 and Q62 are turned off during a period for which gate signals S61 and S62 are at the logic low level (which is also referred to as the "L level" below) and turned on during a period for which they are at the logic high level (which is also referred to as the "H level" below). Switching elements Q61 and Q62 are controlled to complementarily be turned on and off in certain switching cycles in response to gate signals S61 and S62.

It has generally been known that a ratio (power conversion ratio) $K_V$ of an output voltage to an input voltage of a step-up chopper can be expressed as $K_V=1/(1-DT)$ where DT represents a duty ratio which is a ratio of an on period of switching element Q62 to a switching cycle. In FIG. 3, an input voltage to switching converter 60 is input voltage Vin from DC power supply 10 and an output voltage from switching converter 60 is DC voltage V1. Therefore, a duty command value DT* can be calculated such that a voltage conversion ratio between a voltage command value V1* for DC voltage V1 and input voltage Vin satisfies a condition of $V1^*/Vin=1/(1-DT^*)$.

As shown in FIG. 3, switching converter 60 is controlled, for example, under pulse width modulation (PWM) control in accordance with voltage comparison between carrier waves CW at a constant frequency and duty command value DT*. Carrier waves CW are composed of periodic signals (triangular waves or sawtooth waves) varying in voltage in constant cycles within a voltage range corresponding to duty ratios from 0 to 1.0.

During a period for which a voltage of carrier waves CW is higher than duty command value DT*, switching element Q61 is turned on whereas switching element Q62 is turned off. On the other hand, during a period for which duty command value DT* is higher than the voltage of carrier waves CW, switching element Q62 is turned on whereas switching element Q61 is turned off. Thus, as duty command value DT* is larger, the ratio of the on period of switching element Q62, that is, duty radio DT, increases and DC voltage V1 increases. DC voltage V1 of first DC terminal 11 can thus variably be controlled within a range satisfying a condition of V1≥Vin ($K_r$≥1.0) by switching converter 60.

Referring again to FIG. 1, first bridge circuit 12 includes a DC capacitor Cdc1 and switching elements Q11 to Q14. DC capacitor Cdc1 is connected between a power line PL1 connected to a positive side of first DC terminal 11 and a power line NL1 connected to a negative side of first DC terminal 11. In other words, DC capacitor Cdc1 is connected in parallel to first DC terminal 11.

Switching elements Q11 and Q12 form a switching leg as being connected in series between power lines PL1 and NL1. Switching elements Q13 and Q14 form, in parallel to switching elements Q11 and Q12, another switching leg as being connected in series between power lines PL1 and NL1. An intermediate connection point between switching elements Q11 and Q12 and an intermediate connection point between switching elements Q13 and Q14 are connected to first AC terminal 13 connected to winding 41.

Second bridge circuit 22 includes switching elements Q21 to Q24 and a DC capacitor Cdc2. Switching elements Q21 and Q22 form a switching leg as being connected in series between a power line PL2 connected to a positive side of second DC terminal 21 and a power line NL2 connected to a negative side of second DC terminal 21. Switching elements Q23 and Q24 form, in parallel to switching elements Q21 and Q22, another switching leg as being connected in series between power lines PL2 and NL2. An intermediate connection point between switching elements Q21 and Q22 and an intermediate connection point between switching elements Q23 and Q24 are connected to second AC terminal 23 connected to winding 42. DC capacitor Cdc2 is connected between power lines PL2 and NL2 and connected in parallel to second DC terminal 21.

A load 20 is connected to second DC terminal 21. DC power can thus be supplied to load 20. An output voltage from second DC terminal 21 is also referred to as a DC voltage V2 below. DC voltage V2 varies with respect to a rated output voltage from second DC terminal 21, in accordance with power consumed by load 20.

Third bridge circuit 32 includes switching elements Q31 to Q34 and a DC capacitor Cdc3. Since connection relation of switching elements Q31 to Q34 and DC capacitor Cdc3 with a power line PL3 connected to a positive side of third DC terminal 31 and a power line NL3 connected to a negative side of third DC terminal 31 is similar to connection relation of switching elements Q21 to Q24 and DC capacitor Cdc2 with power lines PL2 and NL2 in second bridge circuit 22, detailed description will not be repeated. In third bridge circuit 32, an intermediate connection point between switching elements Q31 and Q32 and an intermediate connection point between switching elements Q33 and Q34 are connected to third AC terminal 33 connected to winding 43.

A load 30 is connected to third DC terminal 31. DC power can thus be supplied to load 30. An output voltage from third DC terminal 31 is also referred to as a DC voltage V3 below. DC voltage V3 varies with respect to a rated output voltage from third DC terminal 31, in accordance with power consumed by load 30.

In transformer 40, winding 41 is also referred to as a primary-side winding 41 below and windings 42 and 43 are also referred to as secondary-side windings 42 and 43 below. First DC terminal 11 is also referred to as primary-side DC terminal 11. Second DC terminal 21 and third DC terminal 31 are also referred to as secondary-side DC terminals 21 and 31. First bridge circuit 12 is also referred to as primary-side bridge circuit 12. Second bridge circuit 22 and third bridge circuit 32 are also referred to as secondary-side bridge circuits 22 and 32. In the present embodiment, a DC power distribution system to supply DC power to a plurality of loads 20 and 30 by means of power conversion device 100 by connection of the plurality of loads 20 and 30 to a plurality of secondary-side DC terminals including second DC terminal 21 and third DC terminal 31 can be configured.

In the present embodiment, a semiconductor switching element with a self-arc-extinguishing function such as an insulated gate bipolar transistor (IGBT) or a metal oxide semiconductor field effect transistor (MOSFET) in which a diode is connected in anti-parallel can be employed for switching elements Q11 to Q14, Q21 to Q24, Q31 to Q34, Q61, and Q62. A plurality of semiconductor switching elements combined in parallel depending on a current capacity can also be employed for each of switching elements Q11 to Q14, Q21 to Q24, Q31 to Q34, Q61, and Q62.

Control device 50 is representatively implemented by a microcomputer and controls operations of power conversion device 100 by hardware processing by embedded electronic circuitry (not shown) and software processing by execution of an installed program by a not-shown central processing unit (CPU). Specifically, control device 50 controls switching (on and off) of switching elements Q11 to Q14, Q21 to Q24, Q31 to Q34, Q61, and Q62 by generating gate signals S11 to S14 to control on and off of switching elements Q11 to Q14, gate signals S21 to S24 to control on and off of switching elements Q21 to Q24, gate signals S31 to S34 to control on and off of switching elements Q31 to Q34, and gate signals S61 and S62 to control on and off of switching elements Q61 and Q62.

First bridge circuit 12 carries out bidirectional DC/AC power conversion between DC voltage V1 of first DC terminal 11 and an AC voltage VT1 of first AC terminal 13 by controlling switching of switching elements Q11 to Q14.

Second bridge circuit 22 carries out bidirectional AC/DC power conversion between an AC voltage VT2 of second AC terminal 23 and a DC voltage V2 of second DC terminal 21 by controlling switching of switching elements Q21 to Q24. Similarly, third bridge circuit 32 carries out bidirectional AC/DC power conversion between an AC voltage VT3 of third AC terminal 33 and a DC voltage V3 of third DC terminal 31 by controlling switching of switching elements Q31 to Q34. AC voltages VT1 to VT3 correspond to voltages applied to respective windings 41 to 43.

Power conversion device 100 can thus supply DC power at different voltage levels to loads 20 and 30 by carrying out in parallel, DC/DC power conversion to convert DC voltage V1 controlled by switching converter 60 to DC voltage V2 by means of first bridge circuit 12, transformer 40, and second bridge circuit 22 and DC/DC power conversion to convert DC voltage V1 from DC power supply 10 to DC voltage V3 by means of first bridge circuit 12, transformer 40, and third bridge circuit 32.

For turning on and off switching elements Q11 to Q14, Q21 to Q24, and Q31 to Q34 in first bridge circuit 12 to third bridge circuit 32, zero voltage switching representing exemplary soft switching can be applied by using an inductance element present between each of first bridge circuit 12 to third bridge circuit 32 and transformer 40 or a leakage inductance of transformer 40. By applying soft switching, reduction in switching loss and reduction in size of transformer 40 by using a higher frequency can be achieved.

When an operating frequency of switching elements Q11 to Q14, Q21 to Q24, and Q31 to Q34 is raised (for example, 61 Hz or higher) for reduction in size of transformer 40, loss (iron loss) increases in transformer 40. Increase in loss by raising a frequency, however, can be suppressed by employing an amorphous material, a silicon steel plate containing 6.5% of silicon, or a silicon steel plate having a thickness of approximately 0.1 mm as a core material.

An electrolytic capacitor or a film capacitor can be applied as DC capacitors Cdc1, Cdc2, Cdc3, and Cdc6. Though a current at a high frequency flows through DC capacitors Cdc1, Cdc2, Cdc3, and Cdc6, application of the film capacitor suppresses deterioration by the current at the high frequency and can achieve longer lifetime.

Figure 4:
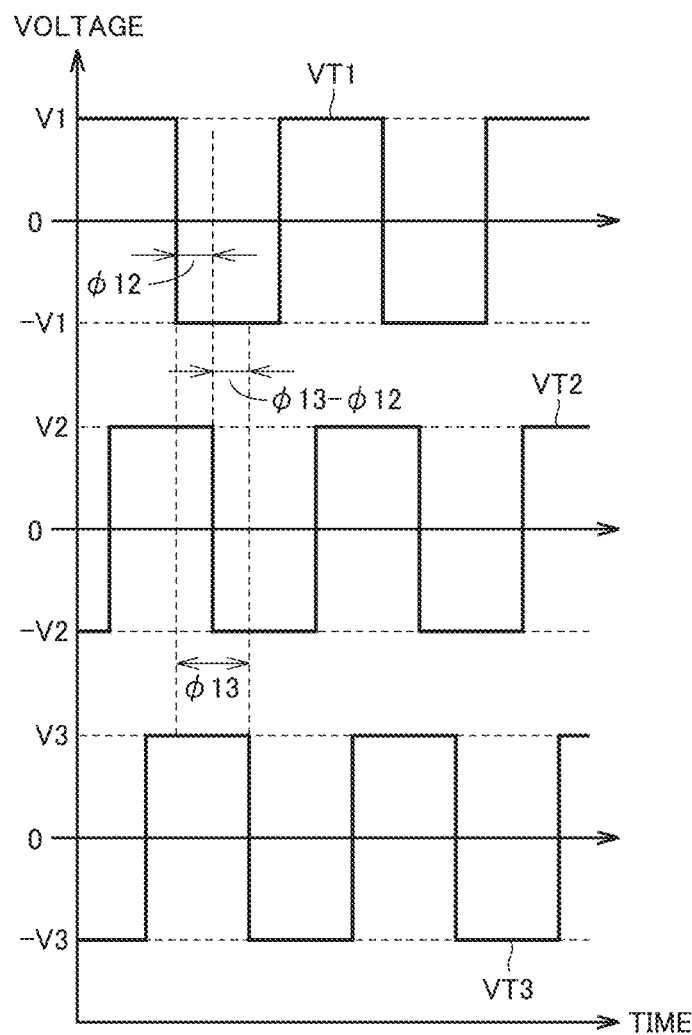
FIG. 4 is a waveform diagram of an AC voltage of each winding of a multiwinding transformer shown in FIG. 1.

FIG. 4 is a waveform diagram of AC voltages VT1 to VT3 of windings 41 to 43 of transformer 40.

Referring to FIG. 4, AC voltage VT1 is a rectangular pulse voltage having DC voltage V1 as an amplitude by controlling switching of switching elements Q11 to Q14. Similarly, AC voltage VT2 is a rectangular pulse voltage having DC voltage V2 as an amplitude by controlling switching of switching elements Q21 to Q24. AC voltage VT3 is a rectangular pulse voltage having DC voltage V3 as an amplitude by controlling switching of switching elements Q31 to Q34. AC voltages VT1 to VT3 have a common frequency corresponding to the operating frequency (switching frequency) of switching elements Q11 to Q14, Q21 to Q24, and Q31 to Q34.

A phase difference ϕ12 can be provided between AC voltage VT1 provided by first bridge circuit 12 and AC voltage VT2 provided by second bridge circuit 22, by adjustment among gate signals S11 to S14 and gate signals S21 to S24. Similarly, a phase difference ϕ13 can be provided between AC voltage VT1 provided by first bridge circuit 12 and AC voltage VT3 provided by third bridge circuit 32, by adjustment among gate signals S11 to S14 and gate signals S31 to S34.

Consequently, a phase difference ϕ13-ϕ12 is produced between AC voltage VT2 provided by second bridge circuit 22 and AC voltage VT3 provided by third bridge circuit 32. In power conversion device 100, transmission power to loads 20 and 30 is controlled by controlling each phase difference. In this case, output power P1 from first bridge circuit 12 is expressed in an expression (1) below.

$$P1 = V1 \cdot V2/K_{12} \cdot \phi 12 \cdot (1-\phi 12/\pi) + V1 \cdot V3/K_{13} \cdot \phi 13 \cdot (1-\phi 13/\pi) \quad (1)$$

Constants $K_{12}$ and $K_{13}$ in the expression (1) are expressed below, by using an operating frequency fs of each switching element, a leakage inductance LS12 between windings 41 and 42, and a leakage inductance LS13 between windings 41 and 43.

$$K_{12} = 2\pi \cdot fs \cdot LS12$$

$$K_{13} = 2\pi \cdot fs \cdot LS13$$

Reception power P12 received by second bridge circuit 22 from first bridge circuit 12 is expressed in an expression (2) below.

$$P12 = V1 \cdot V2/K_{12} \cdot \phi 12 \cdot (1-\phi 12/\pi) \quad (2)$$

Similarly, reception power P13 received by third bridge circuit 32 from first bridge circuit 12 is expressed in an expression (3) below.

$$P13 = V1 \cdot V3/K_{13} \cdot \phi 13 \cdot (1-\phi 13/\pi) \quad (3)$$

In power conversion device 100, electric power is transmitted from a side where the phase difference is advanced to a side where the phase difference is retarded. In the example in FIG. 4, electric power is transmitted from primary-side bridge circuit (on a power supply side) 12 to each of secondary-side bridge circuits (on a load side) 22 and 32 as a result of advance of the phase of AC voltage VT1 relative to the phases of AC voltage VT2 and AC voltage VT3.

Furthermore, electric power is transmitted and received also between second bridge circuit 22 and third bridge circuit 32 owing to a phase difference produced between AC voltages VT2 and VT3. For example, as AC voltage VT2 is advanced in phase relative to AC voltage VT3, transmission power P23 from second bridge circuit 22 to third bridge circuit 32 is generated. Transmission power P23 is expressed in an expression (4) below.

$$P23 = V2 \cdot V3/K_{23} \cdot (\phi 13 - \phi 12) \cdot (1 - (\phi 13 - \phi 12)/\pi) \quad (4)$$

A constant $K_{23}$ in the expression (4) is expressed below, by using operating frequency fs of each switching element and a leakage inductance LS23 between windings 42 and 43.

$$K_{23} = 2 \cdot fs \cdot LS23$$

Therefore, output power P2 from second DC terminal 21 to load 20 and output power P3 from third DC terminal 31 to load 30 are expressed in an expression (5) and an expression (6) below.

$$P2 = P12 - P23 \quad (5)$$

$$P3 = P13 + P23 \quad (6)$$

In power conversion device 100 according to the first embodiment, a maximum value $IL_{12p}$ of an AC current IL12 within first bridge circuit 12 in power transmission to maximum load 20 connected to second DC terminal 21 can be expressed in an expression (7) below.

$$IL_{12p} = IL_{120} + A_{12} \cdot \phi 12 \quad (7)$$

$A_{12}$ in the expression (7) is expressed as $A_{12}=(V1+V2)/K_{12}$ by using $K_{12}$ in common to the expression (1). In addition, $IL_{120}$ is expressed in an expression (8) below, by further using $B_{12}=(V1-V2)/K_{12}$.

$$IL_{120} = (1/2) \cdot \{(A_{12} - B_{12}) \cdot \phi 12 + B_{12} \cdot \pi\} \quad (8)$$

Similarly, a maximum value $IL_{13p}$ of an AC current IL13 within first bridge circuit 12 in power transmission to load 30 connected to third DC terminal 31 can be expressed in an expression (9) below.

$$IL_{13p} = IL_{130} + A_{13} \cdot \phi 13 \quad (9)$$

$A_{13}$ in the expression (9) is expressed as $A_{13}=(V1+V3)/K_{13}$ by using $K_{13}$ in common to the expression (1). In addition, $IL_{130}$ is shown in an expression (10) below, by further using $B_{13}=(V1-V3)/K_{13}$.

$$IL_{130} = (1/2) \cdot \{(A_{13} - B_{13}) \cdot \phi 13 + B_{13} \cdot \pi\} \quad (10)$$

A current effective value $IL_{12rms}$ for second bridge circuit 22 on the load side can be expressed in an expression (11) below, as a cubic function of phase difference $\phi 12$.

$$IL_{12rms} = \sqrt{\{C_3 \cdot \phi 12^3 + C_2 \cdot \phi 12^2 + C_1 \cdot \phi 12 + C_0\}/\pi} \quad (11)$$

Coefficients $C_3$ to $C_1$ and a constant $C_0$ in the expression (11) are shown below, by using $IL_{12p}$, $IL_{120}$, $A_{12}$, and $B_{12}$ in common to the expressions (7) and (8).

$C_3 = (A_{12}{}^2 - B_{12}{}^2)/3$ $C_2 = A_{12} \cdot IL_{120} + B_{12}{}^2 \cdot \pi + B_{12} IL_{12p}$ $C_1 = IL_{120}{}^2 + B_{12}{}^2 \cdot \pi^2 - 2B_{12} \cdot IL_{12p} \cdot \pi - IL_{12p}{}^2$ $C_0 = B_{12}{}^2 \cdot \pi^3/3 + B_{12} \cdot IL_{12p} \cdot \pi^2$ Similarly, a current effective value $IL_{13rms}$ for third bridge circuit 32 on the load side can be expressed in an expression (12) below as a cubic function of phase difference $\phi 13$.

$$IL_{13rms} = \sqrt{\{D_3 \cdot \phi 13^3 + D_2 \cdot \phi 13^2 + D_1 \cdot \phi 13 + D_0\}/\pi} \quad (12)$$

Coefficients $D_3$ to $D_1$ and constant $D_0$ in the expression (12) are shown below, by using $IL_{13p}$, $IL_{130}$, $A_{13}$, and $B_{13}$ in common to the expressions (9) and (10).

$D_3 = (A_{13}{}^2 - B_{13}{}^2)/3$ $D_2 = A_{13} \cdot IL_{130} + B_{13}{}^2 \cdot \pi + B_{13} \cdot IL_{13p}$ $D_1 = IL_{130}{}^2 + B_{13}{}^2 \cdot \pi^2 - 2B_{13} \cdot IL_{13p} \cdot \pi - IL_{13p}{}^2$ $D_0 = B_{13}{}^2 \cdot \pi^3/3 + B_{13} \cdot IL_{13p} \cdot \pi^2$ In the expressions (7) to (12), DC voltage V2 and DC voltage V3 used for calculating $A_{12}$, $B_{12}$, $A_{13}$, and $B_{13}$ are voltages in terms of primary-side winding 41, in consideration of a turns ratio between primary-side winding 41 and secondary-side windings 42 and 43. For example, when a ratio between the number of turns N41 of primary-side winding 41 and the number of turns N42 of secondary-side winding 42 is N41:N42=k:1, DC voltage V2 in terms of primary-side winding 41 corresponds to a value (V2·k) calculated by multiplying actual DC voltage V2 by a turns ratio k. Similarly, when a ratio between the number of turns N41 of primary-side winding 41 and the number of turns N43 of secondary-side winding 43 is N41:N43=m:1, DC voltage V3 in terms of primary-side winding 41 corresponds to a value (V3·m) calculated by multiplying actual DC voltage V3 by a turns ratio m.

Figure 5:
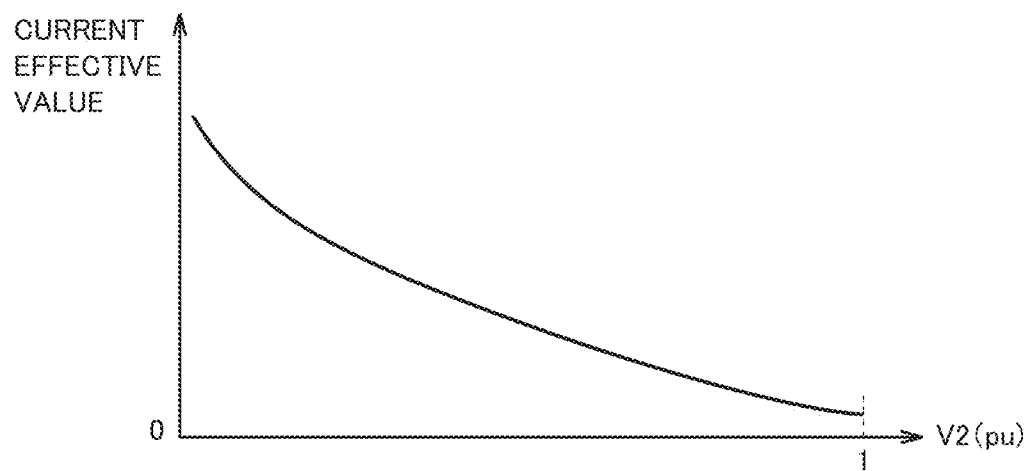
FIG. 5 shows a graph illustrating relation between a DC voltage of a second DC terminal and a current in a second bridge circuit.

FIG. 5 shows a graph illustrating relation between DC voltage V2 of second DC terminal 21 and a current in second bridge circuit 22. The ordinate in FIG. 5 represents current effective value $IL_{12rms}$ in second bridge circuit 22 shown in the expression (11).

The abscissa in FIG. 5 represents DC voltage V2 in terms of primary-side winding 41 as (pu) with DC voltage V1 being defined as the reference. Specifically, in FIG. 5, V2=1 (pu) represents DC voltage V2 in terms of primary-side winding 41 being equal to DC voltage V1. FIG. 5 shows characteristics of current effective value $IL_{12rms}$ by plotting values obtained from the expression (11) for a range of V2<1 (pu).

As is understood from FIG. 5, as DC voltage V2 in terms of primary-side winding 41 is lower as compared with DC voltage V1, in other words, as a voltage difference between DC voltage V1 and DC voltage V2 in terms of primary-side winding 41 is larger, current effective value $IL_{12rms}$ is larger. With increase in current effective value, power loss increases, which results in lower efficiency of power conversion device 100. Increase in cost for equipment due to increase in capacity of an element is also a concern.

As is understood from comparison between the expression (11) and the expression (12), when the abscissa represents DC voltage V3 in terms of primary-side winding 41 as well, current effective value $IL_{13rms}$ in third bridge circuit 32 exhibits characteristics similar to those of current effective value $IL_{12rms}$ in FIG. 5. In other words, as a voltage difference between DC voltage V1 and DC voltage V3 in terms of primary-side winding 41 is larger, current effective value $IL_{13rms}$ is larger.

In particular, when DC power supply 10 generates electric power with renewable energy as in photovoltaic power generation, variation in input voltage Vin is expected to be relatively large. Therefore, when DC voltage V1 of first DC terminal 11 varies with input voltage Vin, $B_{12}$ and $B_{13}$ are larger. Then, current effective value $IL_{12rms}$ in second bridge circuit 22 and current effective value $IL_{13rms}$ in third bridge circuit 32 increase and hence there is a concern about lowering in efficiency of power conversion device 100 or increase in cost for equipment.

In power conversion device 100 according to the first embodiment, switching converter 60 is arranged. Therefore, even though input voltage Vin from DC power supply 10 varies, DC voltage V1 of first DC terminal 11 can variably be controlled. Therefore, switching converter 60 can be controlled to set a voltage ratio between a DC voltage of any one of the plurality of secondary-side DC terminals (second DC terminal 21 and third DC terminal 31) and DC voltage V1 to be constant. An example in which switching converter 60 variably controls DC voltage V1 to set a voltage ratio between DC voltage V2 of second DC terminal 21 and DC voltage V1 to be constant will be described below.

Figure 6:
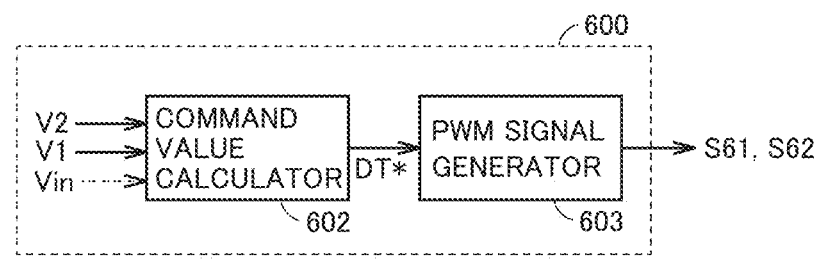
FIG. 6 is a functional block diagram illustrating a control configuration of the switching converter in the power conversion device according to the first embodiment.

FIG. 6 is a functional block diagram illustrating a control configuration of switching converter 60 in power conversion device 100 according to the first embodiment. A function of each block in the configuration shown in FIG. 6 can be performed by at least one of hardware processing and software processing by control device 50.

Referring to FIG. 6, control device 50 includes a controller 600 for switching converter 60. Controller 600 generates gate signals S61 and S62 for switching elements Q61 and Q62 in switching converter 60.

A command value calculator 602 generates duty command value DT* from a detection value of DC voltage V1 of first DC terminal 11 and a detection value of DC voltage V2 of second DC terminal 21. Duty command value DT* is calculated to control DC voltage V1 to substantially be equal to DC voltage V2 (V2·k) (V1=V2·k) in terms of primary-side winding 41 for satisfying a condition of $B_{12}=0$. A PWM signal generator 603 generates gate signals S61 and S62 based on duty command value DT* under PWM control described with reference to FIG. 3.

Command value calculator 602 can generate voltage command value V1*, for example, by multiplying the detection value of DC voltage V2 by turns ratio k between primary-side winding 41 and secondary-side winding 42 (V1*=V2·k), and calculate duty command value DT* by feedback calculation based on a difference $\Delta$V1 of DC voltage V1 from voltage command value V1*.

Alternatively, duty command value DT* can also be calculated by entering a detection value of input voltage Vin and V1*=V2·k into V1*/Vin=1/(1-DT*) representing voltage conversion ratio $K_v$ in a step-up converter described above, as feedforward control for reflecting variation in input voltage Vin. Alternatively, duty command value DT* can also be calculated by combination of feedback control and feedforward control.

Consequently, even though DC voltage V2 varies due to influence of load 20 or additionally even though input voltage Vin from DC power supply 10 varies, a condition of (V1/V2)=k can be maintained. Consequently, as the condition of $B_{12}=0$ is maintained, increase in effective value $IL_{12rms}$ and maximum value $IL_{12p}$ of AC current IL12 in second bridge circuit 22 can be suppressed. Therefore, in power conversion device 100, electric power can be transmitted at high efficiency from DC power supply 10 to load 20 connected to second DC terminal 21.

Therefore, in transmission of electric power to a plurality of loads different in power rating from one another by means of power conversion device 100, a load higher in power rating (for example, an air conditioner or an elevator) can be connected as load 20 to second DC terminal 21, whereas a load lower in power rating (for example, a lighting fixture) can be connected as load 30 to third DC terminal 31. Electric power can thus efficiently be transmitted to load 20 higher in consumed power. Alternatively, load 20 can also be selected based on a maximum value or an average value of consumed power instead of rated electric power.

In contrast, there is a concern about power transmission from DC power supply 10 to load 30 connected to third DC terminal 31 being lower in efficiency than power transmission to load 20, as a result of control of DC voltage V1 with priority being placed on maintaining the condition of $B_{12}=0$. By enhancing efficiency in power transmission to load 20 higher in consumed power, however, a ratio of lost power to total transmission power to load 20 and load 30 can be expected to be lower than in a case without control of DC voltage V1. Consequently, efficiency of power conversion device 100 as a whole can be improved by connecting a load maximum in consumed power (which is also referred to as a maximum load below) among the plurality of loads to second DC terminal 21 as load 20.

Thus, according to the power conversion device in the first embodiment, power loss can be reduced by forming a specific secondary-side DC terminal suitable for connection of a load (maximum load) high in consumed power by controlling the voltage ratio between DC voltages V1 and V2 to be constant by arranging switching converter 60. Consequently, efficiency can be enhanced in the power conversion device including the multiwinding transformer and the bridge circuit without complicated control in each bridge circuit.

Since an excessively large margin for a capacity of equipment associated with bridge circuits 12, 22, and 32 does not have to be provided in consideration of influence of variation in input voltage Vin from DC power supply 10, increase in cost can also be suppressed.

Second Embodiment

Setting of a turns ratio of multiwinding transformer 40 for further enhancing efficiency in the configuration in the first embodiment will be described in a second embodiment.

In the second embodiment, it is assumed that second DC terminal 21 and third DC terminal 31 on the secondary side (on the load side) are different from each other in rated output voltage and that different DC voltages are supplied to loads 20 and 30. In contrast, in the first embodiment, second DC terminal 21 and third DC terminal 31 on the secondary side (on the load side) may be equal to or different from each other in rated output voltage.

In the power conversion device according to the second embodiment, a nominal value of DC voltage V1 (that is, a rated output voltage from DC power supply 10) is set to be substantially equal to a rated output voltage of second DC terminal 21 (that is, a nominal value of DC voltage V2) connected to the maximum load. Furthermore, it is assumed below that a rated output voltage of third DC terminal 31 (that is, a nominal value of DC voltage V3) is lower than voltages V1 and V2.

Figure 7:
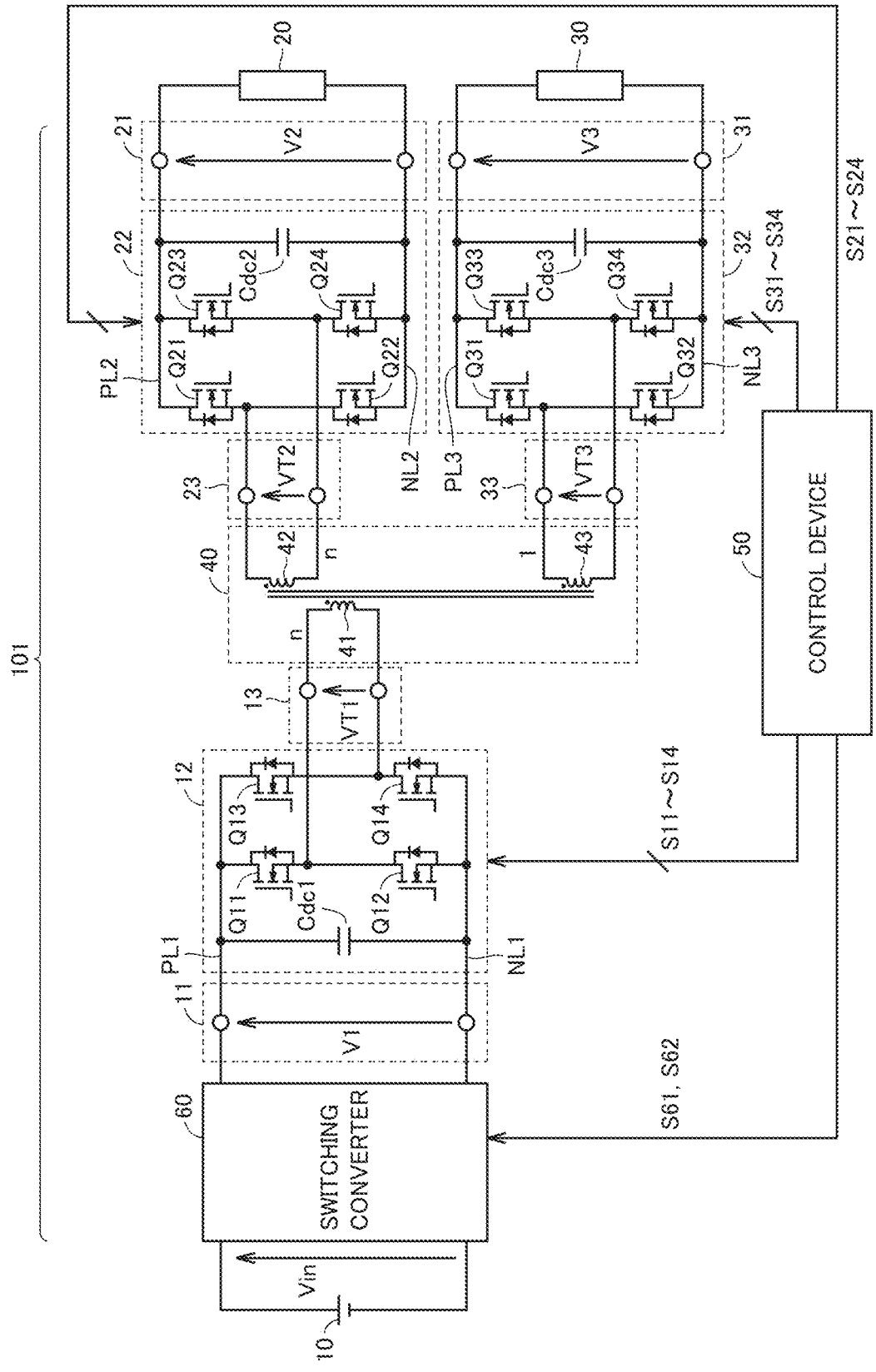
FIG. 7 is a circuit diagram illustrating a configuration of a power conversion device according to a second embodiment.

FIG. 7 is a circuit diagram showing a configuration of a power conversion device 101 according to the second embodiment.

Referring to FIG. 7, the second embodiment is different from the first embodiment in that the turns ratio among windings 41 to 43 of transformer 40 is determined with a ratio of the rated output voltage between second DC terminal 21 and third DC terminal 31 on the secondary side (the load side) being reflected. The configuration other than the turns ratio in transformer 40 is similar to the configuration described with reference to FIG. 1.

By controlling DC voltage V1 to be equal to DC voltage V2, that is, to satisfy the ratio of 1:1 by means of switching converter 60, the number of turns N41 of primary-side winding 41 can be equal to the number of turns N42 of secondary-side winding 42, that is, a condition of N41:N42=1:1 can be satisfied. Since the maximum value and the effective value are thus identical between AC voltage VT1 of primary-side winding 41 and AC voltage VT2 of secondary-side winding 42, design can be common between first bridge circuit 12 and second bridge circuit 22 with identical components being used. Design cost can thus be suppressed.

A turns ratio n between secondary-side winding 42 and secondary-side winding 43 is determined in accordance with a ratio between the rated output voltage of second DC terminal 21 (load 20) and the rated output voltage of third DC terminal 31 (load 30). For example, when DC voltage V2 has the rating of 600 (V) and DC voltage V3 has the rating of 200 (V), n is calculated as n=3.

Consequently, relation of N41:N42:N43=n:n:1 is satisfied among the number of turns N41 of primary-side winding 41, the number of turns N42 of secondary-side winding 42, and the number of turns N43 of secondary-side winding 43. In other words, the turns ratio (n:n) between primary-side winding 41 and secondary-side winding 42 is closer to one than the turns ratio (n:1) between primary-side winding 41 and secondary-side winding 43. The turns ratio between primary-side winding 41 and secondary-side winding 43 is also set to n as high as the turns ratio between secondary-side windings 42 and 43 (m=n in the first embodiment).

Figure 8:
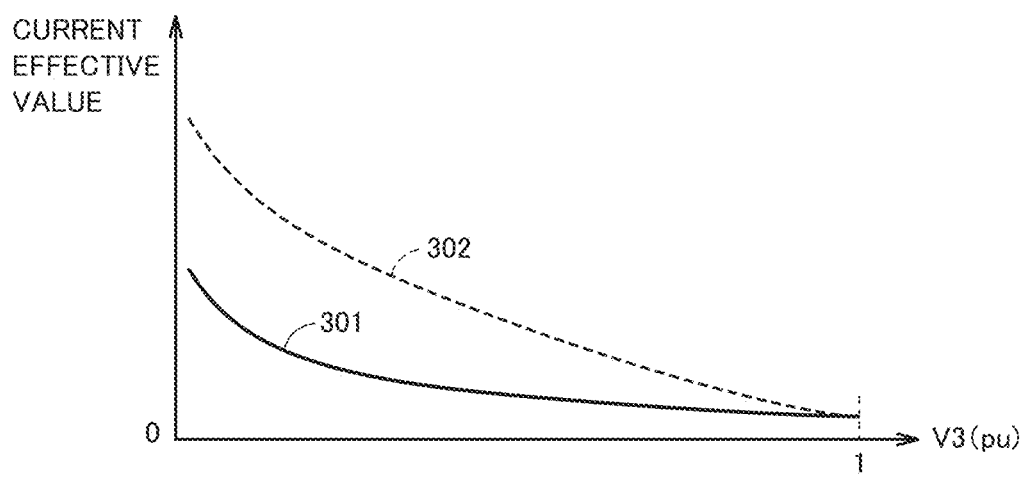
FIG. 8 shows a graph illustrating relation between a DC voltage of a third DC terminal and a current in a third bridge circuit in the power conversion device according to the second embodiment.

FIG. 8 shows a graph illustrating relation between DC voltage V3 of third DC terminal 31 and a current in third bridge circuit 32 in power conversion device 101 according to the second embodiment.

The abscissa in FIG. 8 represents DC voltage V3 in terms of primary-side winding 41 as (pu) with DC voltage V1 being defined as the reference. Specifically, in FIG. 8, V3=1 (pu) shows that DC voltage V3 (V3·n) in terms of primary-side winding 41 is equal to DC voltage V1. FIG. 8 shows characteristics of current effective value $IL_{13rms}$ by plotting values obtained from the expression (12) for a range of V3<1 (pu).

A curve of current effective value $IL_{13rms}$ of third bridge circuit 32 with respect to DC voltage V3 when the turns ratio in transformer 40 is set to N41:N42:N43=1:1:1 is shown with a reference 302.

In contrast, when the turns ratio in transformer 40 is set to N41:N42:N43=n:n:1 in the second embodiment, $A_{13}$ and $B_{13}$ used in the expression (12) are denoted as below while DC voltage V3 in terms of primary-side winding 41 is denoted with turns ratio n.

$$A_{13}=(V1+n \cdot V3)/K_{13}$$

$$B_{13}=(V1-n \cdot V3)/K_{13}$$

In the second embodiment, V1 can be expressed with turns ratio n described above as V1=V3·n based on a condition of V2/V3=V1/V3=n on the premise that a condition of V1=V2 is satisfied. Therefore, a condition of (V1−n·V3)=0 is satisfied and the condition of $B_{13}$=0 is satisfied.

Consequently, owing to the effect of $B_{13}$=0, values of $D_3$ to $D_1$ and constant $D_0$ in the expression (12) become smaller. Though A13 increases depending on the number of turns n, $IL_{130}$ shown in the expression (10) also decreases owing to the effect of the condition of $B_{13}$=0. Therefore, with decrease in current maximum value $IL_{13p}$, values of coefficients $D_3$ to $D_1$ and constant $D_0$ in the expression (12) decrease, which means decrease in current value. A curve of current effective value $IL_{13rms}$ in third bridge circuit 32 with respect to DC voltage V3 is shown with a reference 301 in FIG. 8. As is understood from comparison between the curve shown with reference 301 and the curve shown with reference 302, current effective value $IL_{13rms}$ and current maximum value $IL_{13}$ in third bridge circuit 32 are suppressed in the second embodiment.

Thus, in addition to the effect in the first embodiment, power loss in power transmission to load 30 by third bridge circuit 32 decreases and hence efficiency of power conversion device 101 can be enhanced. Cost for equipment can also be suppressed by suppressing an element capacity associated with third bridge circuit 32.

Third Embodiment

In the second embodiment, the turns ratio in transformer 40 is set to N41:N42:N43=n:n:1 to satisfy the condition of $B_{13}$=0 to thereby suppress a current in third bridge circuit 32 connected to load 30 different from the maximum load, so that efficiency of the power conversion device is enhanced.

Turns ratio n, however, is determined in accordance with a ratio between the rated output voltages (nominal value) of DC voltages V2 and V3. On the other hand, DC voltage V1 is controlled by switching converter 60 to set a voltage ratio thereof to DC voltage V2 to be constant (1:1 in the second embodiment). There is a concern also about variation in DC voltage V3 under the influence of load 30.

When the condition of (V1−n·V3)=0 is no longer satisfied due to these factors, a condition of $B_1 \neq 0$ is set. Then, a current in third bridge circuit 32 increases and there is a concern about increase in power loss. Therefore, in a third embodiment, the current effective value and the current maximum value in third bridge circuit 32 are suppressed by applying PWM control to third bridge circuit 32 in the configuration in the first or second embodiment.

Figure 9:
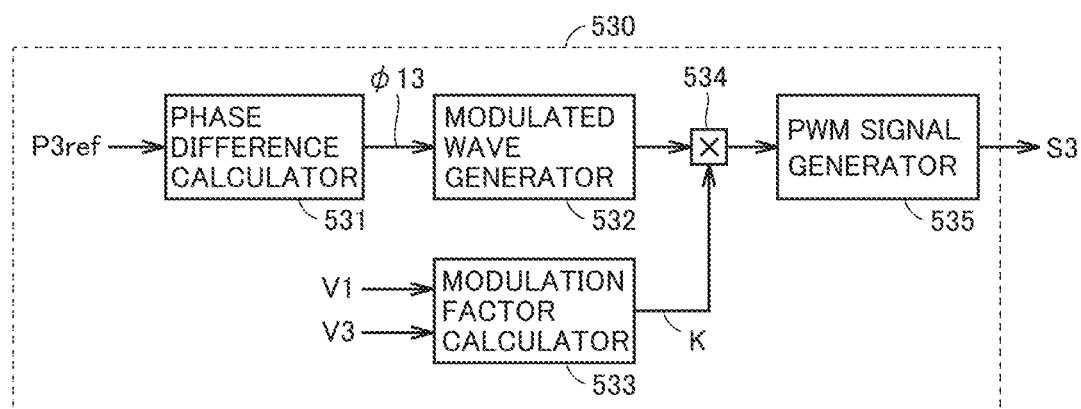
FIG. 9 is a functional block diagram illustrating a control configuration of the third bridge circuit in the power conversion device according to a third embodiment.

FIG. 9 is a functional block diagram illustrating a control configuration of third bridge circuit 32 in the power conversion device according to the third embodiment. A function of each block in the configuration shown in FIG. 9 can be performed by at least one of hardware processing and software processing by control device 50.

Referring to FIG. 9, control device 50 includes a controller 530 for third bridge circuit 32. Controller 530 generates a PWM control signal S3 for third bridge circuit 32. Gate signals S31 to S34 for switching elements Q31 to Q34 are generated based on PWM control signal S3. For example, gate signals S31 and S34 are signals in phase with control signal S3 and gate signals S32 and S33 are signals reverse in phase to control signal S3. Furthermore, a deadtime for turning off both of switching elements Q31 and Q32 is generally provided between gate signals S31 and S32 and gate signals S34 and S33.

Controller 530 includes a phase difference calculator 531, a modulated wave generator 532, a modulation factor calculator 533, a multiplier 534, and a PWM signal generator 535. The third embodiment is also on the premise that the nominal value of DC voltage V1 from DC power supply 10, that is, the rated output voltage from DC power supply 10, is set substantially equally to the rated output voltage of second DC terminal 21 (that is, the nominal value of the input voltage to maximum load 20) as described in the second embodiment (ideally V1=V2).

Phase difference calculator 531 calculates phase difference $\phi 13$ (FIG. 4) between AC voltage VT1 and AC voltage VT3 based on a power command value P3ref for transmission power from third DC terminal 31 to load 30.

Modulated wave generator 532 generates a modulated wave based on phase difference $\phi 13$. The modulated wave is provided as a rectangular wave voltage of 50(%) duty having phase difference $\phi 13$ from AC voltage VT1 in FIG. 4 and is identical in amplitude to carrier waves used in PWM signal generator 535. In general, in sinusoidal PWM, the modulated wave has a frequency of 50 (Hz) or 60 (Hz) which is substantially equal to the commercial system. In the third embodiment, however, the modulated wave has a frequency identical to the switching frequency of each of semiconductor switching elements Q11 to Q24 in second bridge circuit 22 and first bridge circuit 12 to which PWM control is not applied.

Modulation factor calculator 533 calculates a modulation factor K from a detection value of DC voltage V1 of first DC terminal 11 and a detection value of DC voltage V3 of third DC terminal 31, based on an expression (13) below, by using turns ratio n described above. Modulation factor K can be calculated as being restricted within a range of K≤1. In other words, when a condition of V1>(n·V3) is satisfied, modulation factor calculator 533 can provide K=1 in a fixed manner.

$$K = V1/(n \cdot V3) \tag{13}$$

Multiplier 534 multiplies the modulated wave from modulated wave generator 532 by modulation factor K calculated by modulation factor calculator 533.

PWM signal generator 535 generates PWM control signal S3 in accordance with comparison between the modulated wave multiplied by modulation factor K and carrier waves. As is known, carrier waves are composed of periodic signals such as triangular waves or sawtooth waves that are higher in frequency than the modulated wave.

When it is assumed that a condition of K≥1 is satisfied in the configuration in FIG. 8, the modulated waves generated in modulated wave generator 532 are provided to PWM signal generator 535 with the amplitude thereof being maintained or expanded, so that control signal S3 can be generated to turn off PWM control. While PWM control is off, AC voltage VT3 exhibits a waveform similar to that in FIG. 4. In other words, controller 530 in FIG. 9 can also control on and off of PWM control based on a result of calculation of modulation factor K.

Figure 10:
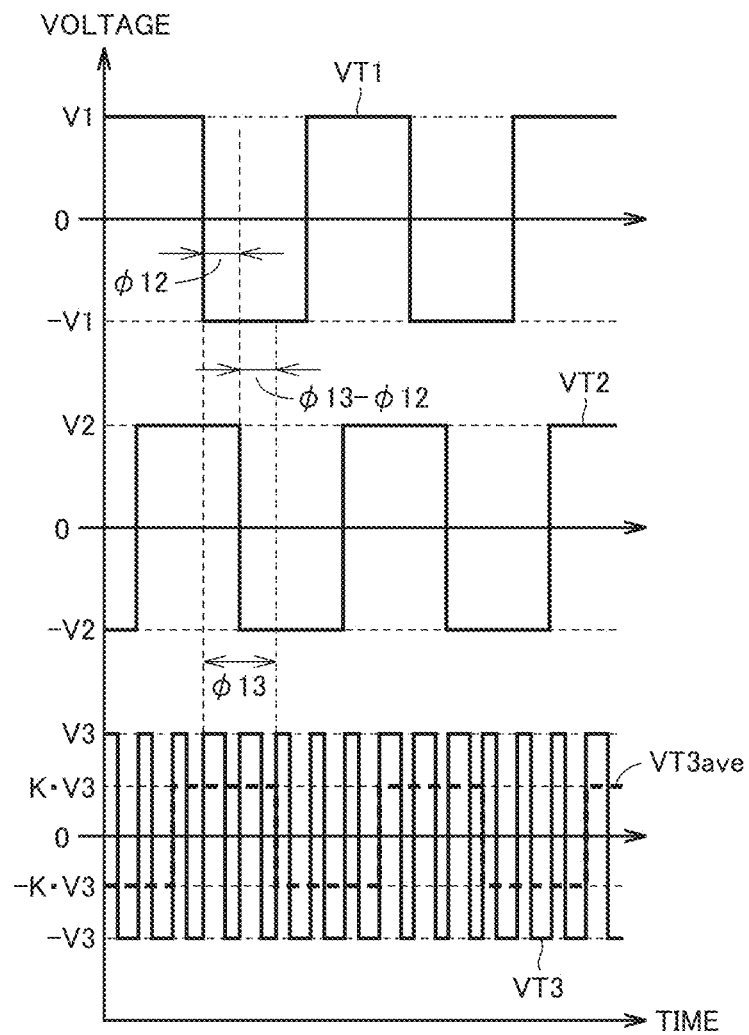
FIG. 10 is a waveform diagram of an AC voltage of each winding of the transformer in the power conversion device according to the third embodiment.

FIG. 10 is a waveform diagram of AC voltages VT1 to VT3 of windings 41 to 43 of transformer 40 in the power conversion device according to the third embodiment.

Referring to FIG. 10, AC voltages VT1 and VT2 as in FIG. 4 are applied to winding 41 and winding 42, respectively. In third bridge circuit 32, switching elements Q31 to Q34 are switched in accordance with a frequency of carrier waves, so that AC voltage VT3 under PWM control is applied to winding 43. An average voltage VT3ave for each modulated wave cycle of AC voltage VT3 exhibits a waveform in phase with AC voltage VT3 in FIG. 4 and K time (K<1) higher in amplitude (peak value) than that. Consequently, a difference between K·n·V3 and DC voltage V1 can be made smaller.

Figure 11:
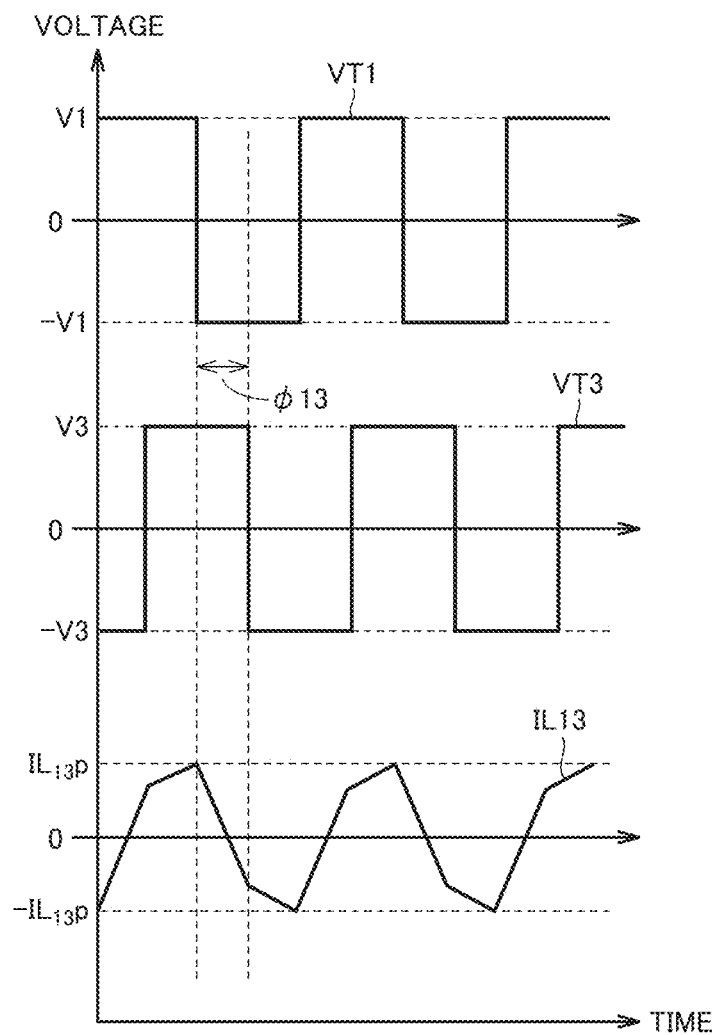
FIG. 11 is a waveform diagram of a current (when pulse width modulation is off) in the third bridge circuit in the power conversion device according to the third embodiment.
Figure 12:
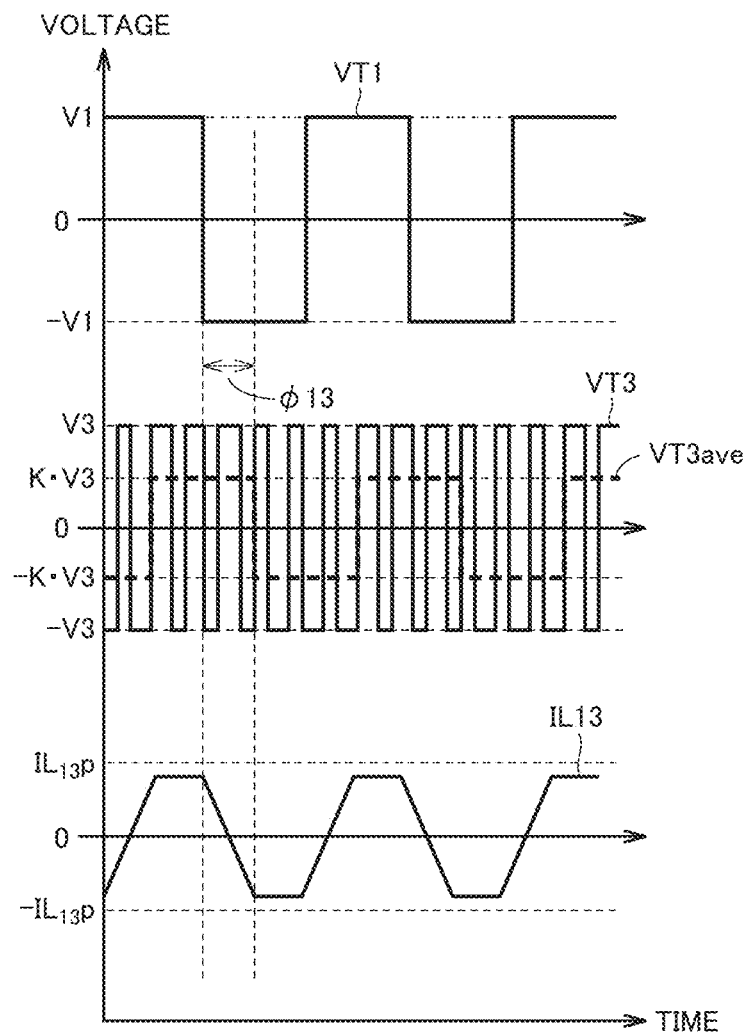
FIG. 12 is a waveform diagram of a current (when pulse width modulation is on) in the third bridge circuit in the power conversion device according to the third embodiment.

FIGS. 11 and 12 show a waveform of a current in third bridge circuit 32 in the power conversion device according to the third embodiment. FIG. 11 shows a waveform diagram when PWM control is off, in other words, when a condition of K=1 is satisfied, and FIG. 12 shows a waveform diagram when PWM control is on (K<1).

In FIG. 11, third bridge circuit 32 generates AC voltage VT3 as in FIG. 4 so that AC current IL13 in third bridge circuit 32 has the maximum value and the effective value in accordance with the expression (9) and the expression (12).

In contrast, in FIG. 12, third bridge circuit 32 generates AC voltage VT3 (FIG. 10) under PWM control. By PWM with modulation factor K being set, $A_{13}$ and $B_{13}$ used in the expression (12) are modified as below, by conversion of DC voltage V3 with a voltage of secondary-side winding 43 in terms of primary-side winding 41.

$$A_{13}=(V1+K\cdot n\cdot V3)/K_{13}$$

$$B_{13}=(V1-K\cdot n\cdot V3)/K_{13}$$

With modulation factor K being set to satisfy the condition K=V1/(n·V3) as described above, a condition of $B_{13}$=0 can be satisfied in spite of change in DC voltage V1 or variation in DC voltage V3. Thus, the maximum value and the effective value of AC current IL13 that flows through third bridge circuit 32 are smaller in FIG. 12 than in FIG. 11.

Consequently, according to the power conversion device in the third embodiment, in spite of variation in DC voltage V3, by suppressing a current in third bridge circuit 32 connected to load 30 different from the maximum load as in the second embodiment, efficiency of the power conversion device can be enhanced and cost for equipment can be suppressed.

Fourth Embodiment

In PWM control described in the third embodiment, when modulation factor K is in a condition of K=V1/(n·V3)<1 due to change in DC voltage V1 or variation in DC voltage V3, AC current IL13 in third bridge circuit 32 can be suppressed. Therefore, the third embodiment is unable to address such a situation that a condition of V1/(n·V3)>1 is set. Therefore, in a fourth embodiment, how to address such variation in DC voltage V3 as leading to the condition of V1/(n·V3)>1 will be described.

Figure 13:
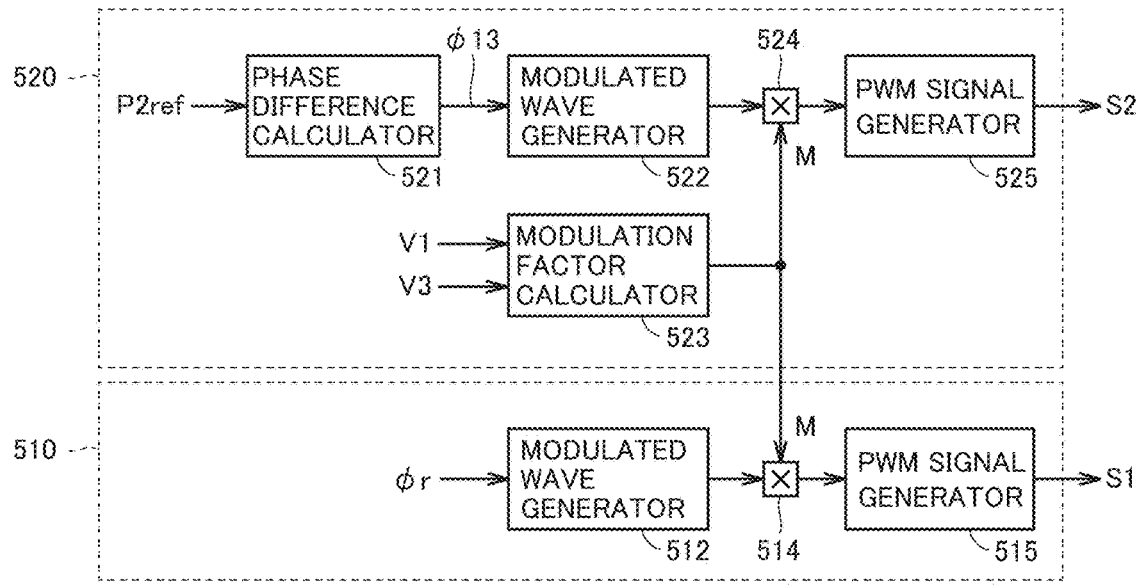
FIG. 13 is a functional block diagram illustrating a control configuration of the first and second bridge circuits in the power conversion device according to a fourth embodiment.

FIG. 13 is a functional block diagram illustrating a control configuration of the first and second bridge circuits in the power conversion device according to the fourth embodiment. A function of each block in the configuration shown in FIG. 13 can be performed by at least one of hardware processing and software processing by control device 50.

Referring to FIG. 13 control device 50 includes a controller 520 for second bridge circuit 22. Controller 520 generates a PWM control signal S2 for second bridge circuit 22. Gate signals S21 to S24 for switching elements Q21 to Q24 are generated based on PWM control signal S2. Since relation between gate signals S21 to S24 and PWM control signal S2 is similar to relation between gate signals S31 to S34 and PWM control signal S3 described above, detailed description will not be repeated.

Controller 520 includes a phase difference calculator 521, a modulated wave generator 522, a modulation factor calculator 523, a multiplier 524, and a PWM signal generator 525. The fourth embodiment is also on the premise that the nominal value of DC voltage V1 from DC power supply 10, that is, the rated output voltage from DC power supply 10, is set substantially equally to the rated output voltage of second DC terminal 21 (that is, the nominal value of the input voltage to maximum load 20) as described in the second embodiment (that is, ideally V1=V2).

Phase difference calculator 521 calculates phase difference ϕ12 (FIG. 4) between AC voltage VT1 and AC voltage VT2 based on a power command value P2ref for transmission power from second DC terminal 21 to load 20 (maximum load).

Modulated wave generator 522 generates a modulated wave based on phase difference ϕ12. The modulated wave is provided as a rectangular wave voltage of 50(%) duty having phase difference ϕ12 from AC voltage VT1 in FIG. 4 and is identical in amplitude to carrier waves used in PWM signal generator 525. In the fourth embodiment, the modulated wave has a frequency identical to the switching frequency of each of semiconductor switching elements Q31 to Q34 of third bridge circuit 32 to which PWM control is not applied.

Modulation factor calculator 523 calculates a modulation factor M from a detection value of DC voltage V1 of first DC terminal 11 and a detection value of DC voltage V3 of third DC terminal 31, based on an expression (14) below, by using turns ratio n described above. It is understood based on the expression (13) and the expression (14) that M is calculated as M=1/K. Modulation factor M can be calculated as being restricted within a range of M≤1. In other words, under a condition of (n·V3)>V1, modulation factor calculator 523 can provide M=1 in a fixed manner.

$$M = (n\cdot V3)/V1 \quad (14)$$

Multiplier 524 multiplies the modulated wave from modulated wave generator 522 by modulation factor M calculated by modulation factor calculator 523. PWM signal generator 515 generates PWM control signal S2 in accordance with comparison between the modulated wave multiplied by modulation factor M and carrier waves. Carrier waves are set as in PWM signal generator 535 in FIG. 9.

Under PWM control with modulation factor M being set, $A_{13}$ and $B_{13}$ used in the expression (12) are modified as below, by denotation of DC voltage V3 as a voltage (n·V3) of secondary-side winding 43 in terms of primary-side winding 41.

$$A_{13}=(M\cdot V1+n\cdot V3)/K_{13}$$

$$B_{13}=(M\cdot V1-n\cdot V3)/K_{13}$$

Therefore, even though a condition of K>1 is set in the third embodiment as a result of change in DC voltage V1 or variation in DC voltage V3, a condition of $B_{13}=0$ can be satisfied by carrying out PWM control with modulation factor M (M<1) being set.

Since first bridge circuit 12 is subjected to PWM control with modulation factor M being set at this time, a peak value of an average value VT1ave of AC voltage VT1 is set to M×V1. Therefore, unless second bridge circuit 22 is also subjected to PWM control with modulation factor M being set, the current effective value within second bridge circuit 22 will increase. Therefore, in the fourth embodiment, PWM control in accordance with common modulation factor M should be applied also to second bridge circuit 22 in addition to first bridge circuit 12.

In the power conversion device according to the fourth embodiment, control device 50 further includes a controller 510 for first bridge circuit 12. Controller 510 generates a PWM control signal S1 for first bridge circuit 12. Gate signals S11 to S14 for switching elements Q11 to Q14 are generated based on PWM control signal S1. Since relation between gate signals S11 to S14 and PWM control signal S1 is also similar to relation between gate signals S31 to S34 and PWM control signal S3 described above, detailed description will not be repeated.

Controller 510 includes a modulated wave generator 512, a multiplier 514, and a PWM signal generator 515.

Modulated wave generator 512 generates a modulated wave having a fixed reference phase φr which serves as the reference for phase differences φ12 and φ13. The modulated wave is provided as a rectangular wave voltage of 50(%) duty corresponding to AC voltage VT1 in FIG. 4 and is identical in amplitude to carrier waves used in PWM signal generator 515. The frequency of carrier waves is identical to the switching frequency of each of semiconductor switching elements Q11 to Q24 in second bridge circuit 22 and first bridge circuit 12.

Multiplier 514 multiplies the modulated wave from modulated wave generator 512 by modulation factor M in common to that for second bridge circuit 22 calculated by modulation factor calculator 523. PWM signal generator 515 generates PWM control signal S1 in accordance with comparison between the modulated wave multiplied by modulation factor M and carrier waves. The PWM signal generator sets carrier waves similarly to PWM signal generator 535 in FIG. 9.

Figure 14:
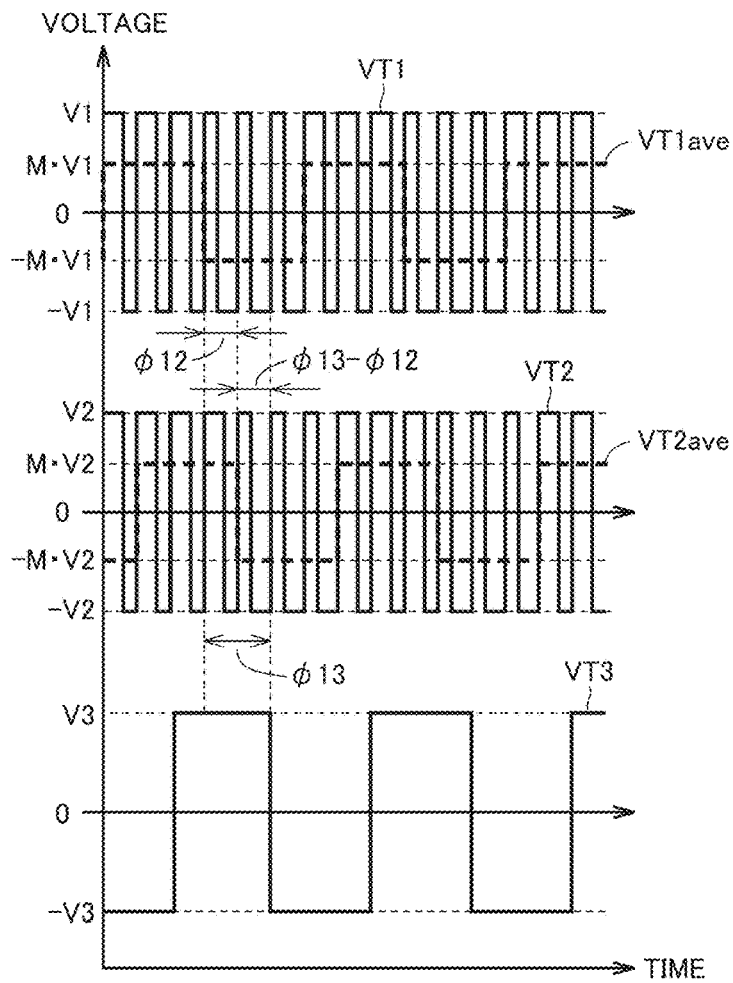
FIG. 14 is a waveform diagram of an AC voltage of the winding of the transformer in the power conversion device according to the fourth embodiment.

FIG. 14 is a waveform diagram of AC voltages VT1 to VT3 of windings 41 to 43 of transformer 40 in the power conversion device according to the fourth embodiment.

Referring to FIG. 14, since PWM control is turned off in third bridge circuit 32, AC voltage VT3 as in FIG. 4 is applied to winding 43. In first bridge circuit 12 and second bridge circuit 22, on the other hand, switching elements Q11 to Q14 and Q21 to Q24 are switched in accordance with a frequency of carrier waves, so that AC voltages VT1 and VT2 under PWM control are applied to windings 41 and 42, respectively.

Average voltage VT1ave for each modulated wave cycle of AC voltage VT1 exhibits a waveform in phase with AC voltage VT1 in FIG. 4 and M time (M<1) higher in amplitude (peak value) than that. Consequently, a difference between n·V3 and M·V1 can be made smaller.

Furthermore, an average voltage VT2ave for each cycle of AC voltage VT2 exhibits a waveform in phase with AC voltage VT2 in FIG. 4 and M time (M<1) higher in amplitude (peak value) than that. Therefore, increase in current effective value within second bridge circuit 22 due to excessively high AC voltage VT2 provided to second bridge circuit 22 can be prevented.

Consequently, according to the power conversion device in the fourth embodiment, even though DC voltage V1 changes or DC voltage V3 varies to a range (K>1) that cannot be addressed in the third embodiment, a current in third bridge circuit 32 connected to load 30 different from the maximum load is suppressed as in the third embodiment so that efficiency of the power conversion device can be enhanced and cost for equipment can be suppressed.

When it is assumed that a condition of M≥1 is satisfied in the configuration in FIG. 13, the modulated waves generated in modulated wave generators 512 and 522 are provided to PWM signal generators 515 and 525 with the amplitude thereof being maintained or expanded, so that control signals S1 and S2 can be generated to turn off PWM control. While PWM control is off, AC voltages VT1 and VT2 exhibit waveforms similar to those in FIG. 4. In other words, controllers 510 and 520 in FIG. 13 can also equivalently switch on and off PWM control based on a result of calculation of modulation factor M.

Relation of M=1/K is satisfied between modulation factor K (the third embodiment) and modulation factor M (the fourth embodiment) as described above. Therefore, when a condition of K<1 is satisfied, a condition of M>1 is satisfied, whereas when a condition of K>1 is satisfied, a condition of M<1 is satisfied.

Therefore, on the assumption that control device 50 includes controller 530 shown in FIG. 8 and controllers 510 and 520 shown in FIG. 13, PWM control in first bridge circuit 12 and second bridge circuit 22 can be turned off when modulation factor calculator 533 calculates modulation factor M as M≥1, and PWM control in third bridge circuit 32 can be turned off when modulation factor calculator 523 calculates modulation factor K as K≥1. Consequently, control device 50 can be configured to automatically select one of control in the third embodiment and control in the fourth embodiment for addressing variation in DC voltage V3.

Application of PWM control in the third and fourth embodiments can also be restricted depending on modulation factors K and M (M=1/K).

Figure 15:
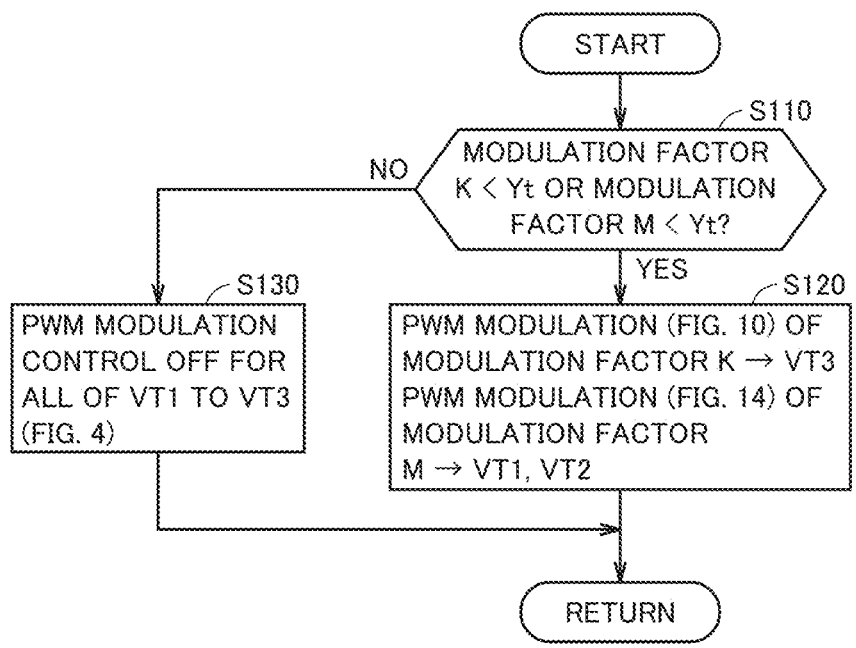
FIG. 15 is a flowchart illustrating processing for controlling on and off of PWM control in the power conversion device according to the third and fourth embodiments.

FIG. 15 is a flowchart illustrating processing for controlling on and off of PWM control in the power conversion device according to the third and fourth embodiments.

Referring to FIG. 15, in S110, control device 50 compares calculated modulation factors K and M with a predetermined threshold value Yt (0<Yt<1). When modulation factor K or M is lower than threshold value Yt, in S120, PWM control in accordance with one of modulation factors K and M is turned on as described in the third and fourth embodiments. Specifically, when a condition of modulation factor K<Yt is satisfied, AC voltage VT3 provided from third bridge circuit 32 is subjected to PWM control in accordance with modulation factor K (FIG. 10) as described in the third embodiment. In contrast, when a condition of modulation factor M<Yt is satisfied, AC voltages VT1 and VT2 provided from first bridge circuit 12 and second bridge circuit 22 are subjected to PWM control in accordance with modulation factor M (FIG. 14) as described in the fourth embodiment.

When both of modulation factors K and M are equal to or higher than threshold value Yt (determination as NO in S110), in S130, PWM control is applied to none of AC voltages VT1 to VT3 provided from first bridge circuit 12, second bridge circuit 22, and third bridge circuit 32. PWM control as above can be turned on and off, for example, by output of K=1 in a fixed manner by modulation factor calculator 533 when a condition of K≥Yt is satisfied and by output of M=1 in a fixed manner by modulation factor calculator 523 when a condition of M≥Yt is satisfied.

Fifth Embodiment

In a fifth embodiment, control for enhancing efficiency of switching converter 60 will be described. As described above, switching converter 60 suppresses a current in second bridge circuit 22 by maintaining a voltage ratio between DC voltages V1 and V2 at a ratio in accordance with turns ratio k (k=1 in the second embodiment), that is, controlling the ratio to satisfy a condition of V1=V2·k.

Therefore, when input voltage Vin to switching converter 60 and voltage command value V1*=V2·k are substantially equal to each other, the voltage ratio between DC voltages V1 and V2 can be controlled to the ratio in accordance with turns ratio k between primary-side winding 41 and secondary-side winding 42 even though input voltage Vin is provided as it is as DC voltage V1. In this case, switching converter 60 can be controlled in a through mode.

Figure 16:
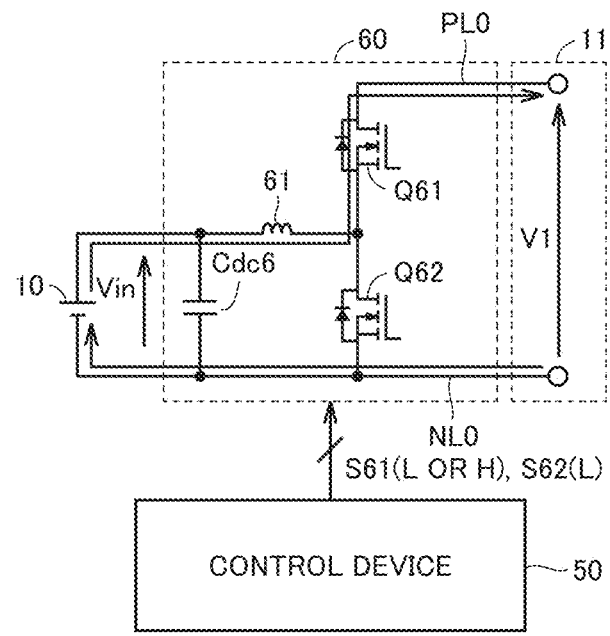
FIG. 16 is a circuit diagram illustrating an operation in a through mode of the switching converter in the power conversion device according to a fifth embodiment.

FIG. 16 is a circuit diagram illustrating an operation in the through mode of switching converter 60 in the power conversion device according to the fifth embodiment.

Referring to FIG. 16, switching converter 60 fixes switching elements Q61 and Q62 to off in the through mode. In other words, in the through mode, control device 50 fixes gate signals S61 and S62 to the L level. Consequently, DC voltage V1 is substantially equal to input voltage Vin through a current path via a diode. Strictly speaking, there is a small voltage difference corresponding to forward voltage lowering in the diode between DC voltage V1 and input voltage Vin. Since power loss (switching loss) due to on and off of switching elements Q61 and Q62 does not occur in the through mode, power loss in switching converter 60 is suppressed.

Since input voltage Vin is consequently provided as it is to first DC terminal 11 without being switched, a voltage conversion ratio is set to 1.0, that is, a condition of DC voltage V1=Vin is satisfied. When the condition of V2/V1=k is satisfied in this state, the condition of $B_{12}=0$ is satisfied as described in the first embodiment. Therefore, power loss in switching converter 60 can be suppressed, and additionally, an AC current in second bridge circuit 22 can be suppressed.

Figure 17:
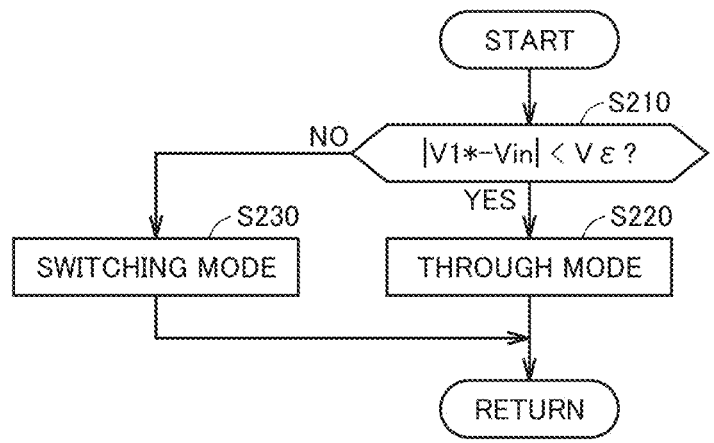
FIG. 17 is a flowchart illustrating processing for controlling an operation mode of the switching converter in the power conversion device according to the fifth embodiment.

FIG. 17 is a flowchart illustrating processing for controlling an operation mode of the switching converter in the power conversion device according to the fifth embodiment. Control device 50 can periodically perform control processing shown in FIG. 17.

Referring to FIG. 17, in S210, control device 50 compares an absolute value (|V1*−Vin|) of a voltage difference between voltage command value V1* calculated from a detection value of DC voltage V2 and turns ratio k and a detection value of input voltage Vin with a criterion value ε. Criterion value c is determined in advance in consideration of a voltage detection error for determining whether or not V1* and Vin are substantially equal to each other.

When a condition of |V1*−Vin|<ε is satisfied (determination as YES in S210), control device 50 selects the through mode in S220. In the through mode, on and off (switching) of switching elements Q61 and Q62 is stopped by fixing gate signals S61 and S62 to the L level. The voltage conversion ratio is thus fixed to one and DC voltage V1 substantially equal to input voltage Vin is provided from switching converter 60. In other words, the through mode corresponds to one embodiment of the "second mode."

Alternatively, when a MOSFET is employed as switching element Q61 in parallel to a diode that forms a current path in the through mode, switching element Q61 may be fixed to on and what is called synchronous rectification may be carried out. According to synchronous rectification, switching loss associated with on and off does not occur in switching element Q61 and furthermore, power loss in the through mode can further be suppressed by allowing a current to pass through the diode and switching element Q61 in parallel.

In contrast, when a condition of |V1*−Vin|≥ε is satisfied (determination as NO in S210), a switching mode is selected in S230. In the switching mode, DC voltage V1 is controlled to voltage command value V1*, for example, by controlling the voltage conversion ratio by turning on and off (switching) switching elements Q61 and Q62 under PWM control shown in FIG. 3. Thus, switching loss is produced in switching converter 60, whereas an AC current in second bridge circuit 22 can be suppressed by satisfying the condition of $B_{12}=0$. In other words, the switching mode corresponds to one embodiment of the "first mode."

In contrast, in the through mode, an AC current in second bridge circuit 22 can be suppressed without production of switching loss in switching converter 60. Therefore, according to the power conversion device in the fifth embodiment, efficiency of the power conversion device can be enhanced by suppressing power loss in switching converter 60 by applying the through mode. The through mode according to the fifth embodiment can be applied to any of the first to fourth embodiments described above.

Though a step-up chopper the voltage conversion ratio of which is equal to or higher than 1.0 is illustrated as switching converter 60 in the first embodiment, a DC/DC converter with any circuit configuration and a voltage conversion ratio range can be employed as switching converter 60 so long as the DC/DC converter such as a step-down chopper the voltage conversion ratio of which is equal to or lower than 1.0 performs a DC voltage conversion function by switching control. In particular, by employing a DC/DC converter with a mode (the through mode) in which an output voltage substantially equal to an input voltage is generated with on and off of the switching element being fixed, the fifth embodiment is also applicable.

Figure 18:
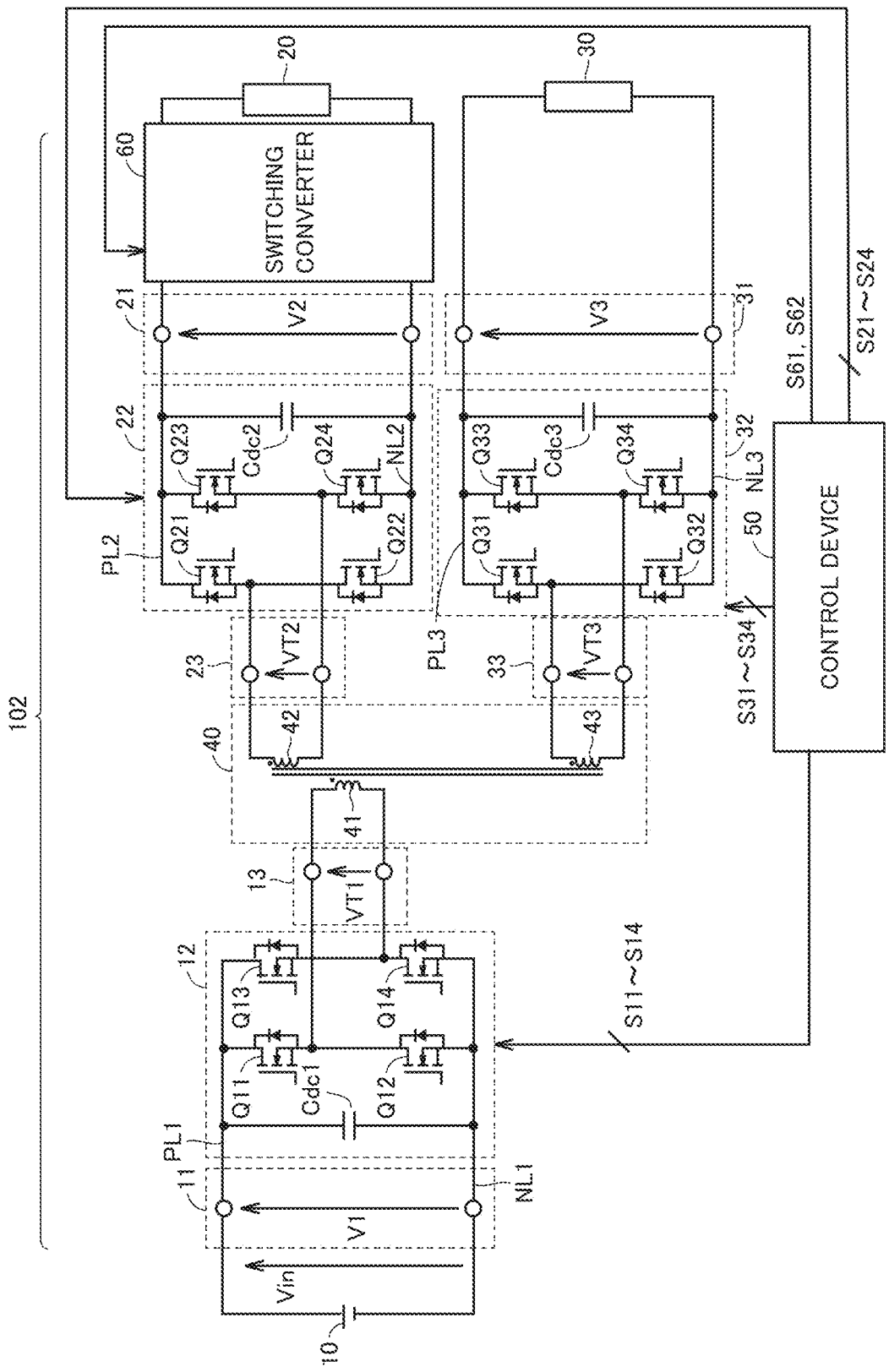
FIG. 18 is a circuit diagram illustrating a modification of arrangement of the switching converter in the power conversion device according to the present embodiment.

Though a ratio between DC voltages V1 and V2 is controlled to be constant by arranging switching converter 60 between DC power supply 10 and DC terminal 11 and variably controlling DC voltage V1 in the first to fifth embodiments, the ratio between DC voltages V1 and V2 can also be controlled to be constant by arranging switching converter 60 on a side of second DC terminal 21 as shown in a modification in FIG. 18.

FIG. 18 shows a circuit diagram illustrating a modification of arrangement of the switching converter in the power conversion device according to the present embodiment.

Referring to FIG. 18, in a power conversion device 102 according to the modification, switching converter 60 can be connected between second DC terminal 21 and load 20. In FIG. 18, an input voltage to switching converter 60 is DC voltage V2 and an output voltage from switching converter 60 is an output voltage Vout to load 20.

For example, feedback control can be carried out in switching converter 60 such that, in order to maintain the condition of (V2/V1=k), duty radio DT is lowered when DC voltage V2 should be increased, whereas duty radio DT is increased when DC voltage V2 should be lowered.

Furthermore, an expression (15) below is satisfied based on voltage conversion ratio $K_v = Vout \cdot V2$ of switching converter 60 in FIG. 18.

$$Vout = V2/(1 - DT) \qquad (15)$$

Therefore, an expression (16) is obtained by substituting $V2 = V1 \cdot k$ and an input rated voltage (nominal value) $V2^*$ of load 20 into the expression (15) (Vout=$V2^*$) for maintaining the condition of (V2/V1=k).

$$V2^* = (k \cdot V1)/(1 - DT) \qquad (16)$$

The voltage ratio between DC voltages V1 and V2 can be controlled to be constant and output voltage Vout to load 20 can also be controlled to be constant (Vout=$V2^*$) by feedforward control for setting duty command value DT* in accordance with an expression (17) obtained by solving the expression (16) in terms of DT.

$$DT^* = (V2^* - k \cdot V1)/V2^* \qquad (17)$$

Alternatively, duty command value DT* can also be calculated based on combination of feedback control and feedforward control. In the configuration in FIG. 18, DC power from DC power supply 10 is directly supplied to first DC terminal 11. Therefore, DC voltage V1 of first DC terminal 11 varies in coordination with input voltage Vin from DC power supply 10.

Therefore, in power conversion device 102 in FIG. 18 in which DC voltage V2 is controlled, DC power supply 10 is implemented by a stable power supply such as a storage battery, which is suitable for a case in which voltage variation due to influence of load 20 is greater. The exemplary configuration in FIG. 1 in which DC voltage V1 is controlled is suitable also for a case in which input voltage Vin from DC power supply 10 varies as described above. Thus, in the power conversion device in the present embodiment, control of the voltage ratio between DC voltage V1 of primary-side DC terminal 11 and DC voltage V2 of secondary-side DC terminal 21 to be constant can be realized in the configuration in which switching converter 60 controls any of DC voltages V1 and V2.

In the exemplary configuration in FIGS. 1, 7, and 18, first DC terminal 11 corresponds to one embodiment of the "primary-side DC terminal," and second DC terminal 21 and third DC terminal 31 correspond to one embodiment of the "plurality of secondary-side DC terminals." In transformer 40 which is the multiwinding transformer, winding 41 corresponds to one embodiment of the "primary-side winding" and windings 42 and 43 correspond to one embodiment of the "plurality of secondary-side windings." Bridge circuit 12 corresponds to one embodiment of the "primary-side bridge circuit" and second bridge circuit 22 and third bridge circuit 32 correspond to one embodiment of the "plurality of secondary-side bridge circuits." Switching converter 60 corresponds to one embodiment of the "voltage control circuit."

Winding 42 of windings 42 and 43 that constitute the "plurality of secondary-side windings" corresponds to one embodiment of the "first secondary-side winding" and winding 43 corresponds to one embodiment of the "second secondary-side winding." Furthermore, second DC terminal 21 corresponding to winding 42 of the "plurality of secondary-side DC terminals" corresponds to one embodiment of the "first secondary-side DC terminal" and second bridge circuit 22 corresponds to one embodiment of the "first secondary-side bridge circuit." Similarly, third DC terminal 31 corresponding to winding 43 corresponds to one embodiment of the "second secondary-side DC terminal" and third bridge circuit 32 corresponds to one embodiment of the "third secondary-side bridge circuit."

The first to fifth embodiments can also be configured such that switching converter 60 controls a voltage ratio between DC voltage V3 of third DC terminal 31 and DC voltage V1 instead of a ratio between DC voltage V2 of second DC terminal 21 and DC voltage V1, similarly to (V2/V1) above. In this case, instead of second DC terminal 21, third DC terminal 31 can suitably be adapted to connection of the maximum load. In other words, by modifying control of switching converter 60, any of a plurality of secondary-side DC terminals can also be employed as the secondary-side DC terminal suitable for connection of the maximum load.

Furthermore, in the second embodiment (FIG. 7) as well, setting of a turns ratio of each winding of the multiwinding transformer described in the second embodiment can similarly be applied even to a configuration in which the maximum load is connected to a plurality of secondary-side DC terminals 31, by control of a ratio between DC voltages V1 and V3 by switching converter 60. An effect the same as described in the second embodiment can be achieved specifically by setting the turns ratio between the primary-side winding (the power supply-side winding) and the secondary-side winding (the maximum load-side winding) connected to the maximum load to be closer to 1:1 than the turns ratio between the primary-side winding and another secondary-side winding and by setting the turns ratio between each secondary-side winding to which the load other than the maximum load is connected and the maximum load-side winding in accordance with a ratio between the rated output voltage to that load and the rated output voltage to the maximum load.

The configurations of the power conversion devices shown in FIGS. 1, 7, and 18 are by way of example and the number of secondary-side windings in the multiwinding transformer and the number of arranged secondary-side bridge circuits and secondary-side DC terminals corresponding to the number of windings may be set to three or more. In this case as well, a similar effect can be achieved by control to maintain a ratio between a DC voltage of any one of the plurality of secondary-side DC terminals and a DC voltage of the primary-side DC terminal to be constant. In other words, the power conversion devices described in the first to fifth embodiments and the DC power distribution system in which a load is further connected to the former can be applied in common to the configuration to transmit electric power to a plurality of loads connected to a plurality of secondary-side (load-side) windings.

The configuration of the bridge circuit can also be different from the configurations in FIGS. 1 and 6 so long as DC/AC power conversion can be carried out in application of the first and second embodiments and so long as bidirectional DC/AC power conversion under PWM control can be carried out in application of the third to fifth embodiments.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST

10 DC power supply; 11 first DC terminal (primary-side DC terminal); 12 first bridge circuit (primary-side bridge circuit); 13 first AC terminal; 20 load (maximum load); 21 second DC terminal (secondary-side DC terminal); 22 second bridge circuit (secondary-side bridge circuit); 23 second AC terminal; 30 load; 31 third DC terminal (secondary-side DC terminal); 32 third bridge circuit (secondary-side bridge circuit); 33 third AC terminal; 40 multiwinding transformer; 41 winding (primary-side winding); 42, 43 winding (secondary-side winding); 50 control device; 60 switching converter; 61 inductor; 100 to 102 power conversion device; 510, 520, 530, 600 controller; 512, 522, 532 modulated wave generator; 514, 524, 534 multiplier; 515, 525, 535, 603 PWM signal generator; 521, 531 phase difference calculator; 523, 533 modulation factor calculator; 602 command value calculator; Cdc1 to Cdc3, Cdc6 DC capacitor; DT* duty command value; K, M modulation factor; NL0 to NL3, PL0 to PL3 power line; P2ref, P3ref power command value; Q11 to Q14, Q21 to Q24, Q31 to Q34, Q61, Q62 semiconductor switching element; S1 to S3 PWM control signal; S11 to S14, S21 to S24, S31 to S34, S61, S62 gate signal; V1 to V3 DC voltage; VT1 to VT3 AC voltage

The invention claimed is:

1. A power conversion device comprising:
a multiwinding transformer including a primary-side winding and a plurality of secondary-side windings;
a primary-side DC terminal supplied with DC power from a DC power supply;
a plurality of secondary-side DC terminals;
a primary-side bridge circuit connected between the primary-side DC terminal and the primary-side winding, the primary-side bridge circuit carrying out DC/AC power conversion;
a plurality of secondary-side bridge circuits connected between the plurality of secondary-side windings and the plurality of secondary-side DC terminals, respectively, the plurality of secondary-side bridge circuits carrying out AC/DC power conversion,
the plurality of secondary-side DC terminals including
a first secondary-side DC terminal electrically connected to a first secondary-side winding of the plurality of secondary-side windings with a first secondary-side bridge circuit of the plurality of secondary-side bridge circuits being interposed, and
a second secondary-side DC terminal electrically connected to a second secondary-side winding of the plurality of secondary-side windings with a second secondary-side bridge circuit of the plurality of secondary-side bridge circuits being interposed; and
a voltage control circuit to variably control, even when at least one of a first DC voltage of the primary-side DC terminal and a second DC voltage of the first secondary-side DC terminal varies, the first or second DC voltage so as to maintain a voltage ratio between the first DC voltage and the second DC voltage at a predetermined ratio in accordance with a turns ratio between the primary-side winding and the first secondary-side winding,
wherein the voltage control circuit includes a converter, the power conversion device further including a control device to control the primary-side bridge circuit and the plurality of secondary-side bridge circuits, wherein
the control device includes
a first controller to control the primary-side bridge circuit so as to provide a first AC voltage having a reference phase,
a second controller to control the first secondary-side bridge circuit so as to provide a second AC voltage having a phase difference from the reference phase in accordance with a transfer power command value from the first secondary-side DC terminal, and
a third controller to control the second secondary-side bridge circuit so as to provide a third AC voltage having a phase difference from the reference phase in accordance with a transfer power command value from the second secondary-side DC terminal.

2. The power conversion device according to claim 1, wherein
the voltage control circuit is connected between the DC power supply and the primary-side DC terminal and variably controls the first DC voltage so as to maintain the voltage ratio at the predetermined ratio.

3. The power conversion device according to claim 1, wherein
the voltage control circuit is connected between the first secondary-side DC terminal and a load supplied with electric power from the first secondary-side DC terminal and variably controls the second DC voltage so as to maintain the voltage ratio at the predetermined ratio.

4. The power conversion device according to claim 1, wherein
the first secondary-side DC terminal and the second secondary-side DC terminal supply output voltages different from each other, and
a turns ratio between the first secondary-side winding and the second secondary-side winding complies with a ratio between a rated output voltage of the first secondary-side DC terminal and a rated output voltage of the second secondary-side DC terminal.

5. The power conversion device according to claim 4, wherein
the turns ratio between the primary-side winding and the first secondary-side winding is closer to one than a turns ratio between the primary-side winding and the second secondary-side winding.

6. The power conversion device according to claim 1, wherein
when a third DC voltage in terms of the primary-side winding which is provided from the second secondary-side DC terminal becomes higher than the first DC voltage due to variation in third DC voltage, the third controller applies pulse width modulation control to the third AC voltage in accordance with a first modulation factor calculated by dividing the first DC voltage by the third DC voltage in terms of the primary-side winding.

7. The power conversion device according to claim 6, wherein
when the third DC voltage in terms of the primary-side winding becomes lower than the first DC voltage due to variation in third DC voltage, the first and second controllers apply pulse width modulation control to both of the first and second AC voltages in accordance with a second modulation factor calculated by dividing the third DC voltage in terms of the primary-side winding by the first DC voltage, and
when both of the first and second modulation factors are equal to or higher than a predetermined threshold value within a range smaller than one, pulse width modulation control is applied to none of the first AC voltage, the second AC voltage, and the third AC voltage.

8. The power conversion device according to claim 1, wherein when a third DC voltage in terms of the primary-side winding which is provided from the second secondary-side DC terminal becomes lower than the first DC voltage due to variation in third DC voltage, the first and second controllers apply pulse width modulation control to both of the first and second AC voltages in accordance with a second modulation factor calculated by dividing the third DC voltage in terms of the primary-side winding by the first DC voltage.

9. A DC power distribution system comprising:
the power conversion device according to claim 1; and
a plurality of loads connected to the plurality of secondary-side DC terminals and supplied with DC power, respectively, wherein
a load maximum in power consumption among the plurality of loads is connected to the first secondary-side DC terminal.

10. The power conversion device according to claim 1, wherein
the voltage control circuit is connected to the DC power supply to variably control the first DC voltage so as to maintain the voltage ratio at the predetermined ratio.

11. A power conversion device comprising:
a multiwinding transformer including a primary-side winding and a plurality of secondary-side windings;
a primary-side DC terminal supplied with DC power from a DC power supply;
a plurality of secondary-side DC terminals;
a primary-side bridge circuit connected between the primary-side DC terminal and the primary-side winding, the primary-side bridge circuit carrying out DC/AC power conversion;
a plurality of secondary-side bridge circuits connected between the plurality of secondary-side windings and the plurality of secondary-side DC terminals, respectively, the plurality of secondary-side bridge circuits carrying out AC/DC power conversion,
the plurality of secondary-side DC terminals including
a first secondary-side DC terminal electrically connected to a first secondary-side winding of the plurality of secondary-side windings with a first secondary-side bridge circuit of the plurality of secondary-side bridge circuits being interposed, and
a second secondary-side DC terminal electrically connected to a second secondary-side winding of the plurality of secondary-side windings with a second secondary-side bridge circuit of the plurality of secondary-side bridge circuits being interposed; and
a voltage control circuit to variably control, even when at least one of a first DC voltage of the primary-side DC terminal and a second DC voltage of the first secondary-side DC terminal varies, the first or second DC voltage so as to maintain a voltage ratio between the first DC voltage and the second DC voltage at a predetermined ratio in accordance with a turns ratio between the primary-side winding and the first secondary-side winding,
wherein the voltage control circuit includes a converter,
a first mode in which a voltage conversion ratio between an input voltage and an output voltage is controlled by turning on and off a semiconductor switching element, and
a second mode in which the voltage conversion ratio is fixed to one by fixing on and off of the semiconductor switching element, and
when the voltage ratio between the first and second DC voltages can be controlled to the predetermined ratio even though the voltage conversion ratio is set to one, the voltage control circuit operates in the second mode.

12. A power conversion device comprising:
a multiwinding transformer including a primary-side winding and a plurality of secondary-side windings;
a primary-side DC terminal supplied with DC power from a DC power supply;
a plurality of secondary-side DC terminals;
a primary-side bridge circuit connected between the primary-side DC terminal and the primary-side winding, the primary-side bridge circuit carrying out DC/AC power conversion;
a plurality of secondary-side bridge circuits connected between the plurality of secondary-side windings and the plurality of secondary-side DC terminals, respectively, the plurality of secondary-side bridge circuits carrying out AC/DC power conversion,
the plurality of secondary-side DC terminals including
a first secondary-side DC terminal electrically connected to a first secondary-side winding of the plurality of secondary-side windings with a first secondary-side bridge circuit of the plurality of secondary-side bridge circuits being interposed, and
a second secondary-side DC terminal electrically connected to a second secondary-side winding of the plurality of secondary-side windings with a second secondary-side bridge circuit of the plurality of secondary-side bridge circuits being interposed; and
a voltage control circuit to variably control, even when at least one of a first DC voltage of the primary-side DC terminal and a second DC voltage of the first secondary-side DC terminal varies, the first or second DC voltage so as to maintain a voltage ratio between the first DC voltage and the second DC voltage at a predetermined ratio in accordance with a turns ratio between the primary-side winding and the first secondary-side winding,
wherein the voltage control circuit includes a converter, and
the voltage control circuit is further configured so that when the voltage ratio between the first and second DC voltages can be controlled to the predetermined ratio even though the voltage conversion ratio is set to one, the voltage control circuit operates to control a voltage conversion ratio between an input voltage and an output voltage by turning on and off a semiconductor switching element.

* * * * *